United States Patent
Wood et al.

(10) Patent No.: US 12,367,506 B2
(45) Date of Patent: *Jul. 22, 2025

(54) DATA PROCESSING SYSTEMS AND METHODS FOR CONTROLLING AN AUTOMATED SURVEY SYSTEM

(71) Applicant: OPEN TEXT CORPORATION, Waterloo (CA)

(72) Inventors: Lorne Edward Wood, McKinney, TX (US); Steven John Graff, Grapevine, TX (US)

(73) Assignee: Open Text Corporation, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/397,978

(22) Filed: Dec. 27, 2023

(65) Prior Publication Data

US 2024/0127274 A1  Apr. 18, 2024

Related U.S. Application Data

(63) Continuation of application No. 15/958,960, filed on Apr. 20, 2018, now Pat. No. 11,941,649.

(51) Int. Cl.
*G06Q 10/00* (2023.01)
*G06Q 30/0201* (2023.01)
*G06Q 30/0203* (2023.01)

(52) U.S. Cl.
CPC ..... *G06Q 30/0203* (2013.01); *G06Q 30/0201* (2013.01)

(58) Field of Classification Search
CPC ...... G09B 19/00; G09B 19/0053; G06N 5/04; G06N 20/00; G06Q 30/0203
See application file for complete search history.

(56) References Cited

U.S. PATENT DOCUMENTS 11,805,204 B2  10/2023  Miller
11,941,649 B2   3/2024  Wood
(Continued)

FOREIGN PATENT DOCUMENTS

CA    2845174 A1 * 11/2014 ......... G06Q 30/0203

OTHER PUBLICATIONS

Notice of Allowance for U.S. Appl. No. 18/314,583, mailed Jun. 7, 2024, 5 pgs.
(Continued)

*Primary Examiner* — Brian M Epstein
*Assistant Examiner* — Reham K Abouzahra
(74) *Attorney, Agent, or Firm* — Sprinkle IP Law Group

(57) ABSTRACT

Embodiments as disclosed provide data processing systems and methods for controlling an automated survey system. One embodiment comprises: a processor; a data store storing a plurality of transactions thereon, each transaction comprising transaction metadata and a voice session recording of an inbound call, the transaction metadata for each transaction comprising an identifier for that transaction; a non-transitory computer readable medium having instructions executable on the processor for: generating, by the processor, a worklist for the survey campaign to control conducting of surveys by an automated survey system that is configured to execute the worklist, the worklist comprising a work item for each of the set of transactions and each work item comprising transaction identification data for a transaction from the set of transactions and contact information for the survey target for the transaction corresponding to the transaction identification data in the work item.

21 Claims, 19 Drawing Sheets

(56) References Cited

U.S. PATENT DOCUMENTS

| | | | |
|---|---|---|---|
| 12,124,459 B2 | 10/2024 | Graff | |
| 12,284,315 B2 | 4/2025 | Miller | |
| 2002/0128898 A1* | 9/2002 | Smith, Jr. | G06Q 30/0203 705/7.32 |
| 2003/0105659 A1* | 6/2003 | Eisenstein | G06Q 30/02 705/7.32 |
| 2007/0233549 A1* | 10/2007 | Watson | G06Q 10/06398 379/266.1 |
| 2008/0010351 A1* | 1/2008 | Wardhaugh | G06Q 30/02 709/206 |
| 2008/0086457 A1 | 4/2008 | Fei | |
| 2008/0263023 A1 | 10/2008 | Vailaya | |
| 2012/0084081 A1* | 4/2012 | Melamed | G06F 16/3344 704/211 |
| 2014/0046726 A1* | 2/2014 | Brandt | G06Q 30/0203 705/7.32 |
| 2014/0122183 A1* | 5/2014 | Niu | G06Q 30/0203 705/7.32 |
| 2014/0288944 A1* | 9/2014 | Miller | G09B 23/28 434/262 |
| 2015/0177964 A1* | 6/2015 | Spirer | G06F 16/4393 715/732 |
| 2015/0356578 A1* | 12/2015 | Li | G06Q 30/0203 705/7.32 |
| 2016/0119477 A1* | 4/2016 | Sharpe | G06Q 30/0261 379/265.09 |
| 2016/0180360 A1* | 6/2016 | Tietzen | G06Q 30/0203 705/7.32 |
| 2016/0189037 A1* | 6/2016 | Pereg | G06N 7/01 706/12 |
| 2016/0196522 A1* | 7/2016 | Niu | G06Q 30/0203 705/7.39 |
| 2017/0140467 A1* | 5/2017 | Neag | G10L 15/00 |
| 2017/0257482 A1 | 9/2017 | Chapman | |
| 2019/0034060 A1 | 1/2019 | Ahmad | |
| 2023/0421694 A1 | 12/2023 | Miller | |
| 2025/0036637 A1 | 1/2025 | Graff | |

OTHER PUBLICATIONS

Office Action for U.S. Appl. No. 15/990,279, mailed Jul. 5, 2024, 29 pgs.

Office Action for U.S. Appl. No. 18/464,890, mailed Jul. 31, 2024, 8 pgs.

Office Action for U.S. Appl. No. 18/314,583, mailed Nov. 22, 2023, 26 pgs.

Office Action for U.S. Appl. No. 15/990,279, mailed Feb. 15, 2024, 18 pgs.

Supplemental Notice of Allowance for U.S. Appl. No. 15/958,960, mailed Feb. 14, 2024, 4 pgs.

Notice of Allowance for U.S. Appl. No. 18/464,890, mailed Dec. 11, 2024, 6 pgs.

Office Action for U.S. Appl. No. 15/990,279, mailed Jan. 2, 2025, 32 pgs.

Office Action for U.S. Appl. No. 18/828,853, mailed Jun. 16, 2025, 16 pgs.

* cited by examiner

600 opentext™ | Qfiniti

💾 Save  ✎ABC Spell Check                                                                      🗑 Delete

| Categories | | Version: N/A |
|---|---|---|
| ⓘ General Information | Answer Choices | |
| ❓ Web Question | | |
| 📞 Voice Question | | |
| 💡 Answer Choices | | |
| ⚠ Inbound Alerts | | |
| ☰ All Categories | | |

| Name | Score |
|---|---|
| Yes | 1 |
| No | 2 |

New Record

FIG. 6A

600 opentext™ | Qfiniti

💾 Save  ✏️ Spell Check                                                              🗑 Delete

| Categories |
|---|
| ⓘ General Information |
| ❓ Web Question |
| 📞 Voice Question |
| 💡 Answer Choices |
| ⚠️ Inbound Alerts |
| ≣ All Categories |

Answer Choices                                                                  Version: N/A

| Score | Label | Active |
|---|---|---|
| 0 | | ☐ |
| 1 | | ☑ |
| 2 | | ☑ |
| 3 | | ☐ |
| 4 | | ☐ |
| 5 | | ☐ |
| 6 | | ☐ |
| 7 | | ☐ |
| 8 | | ☐ |
| 9 | | ☐ |
| 10 | | ☐ |
| 11 | | ☐ |

New Record

FIG. 6B opentext™ | Qfiniti

🖫 Save   ✎ Spell Check                                                                    🗑 Delete

| Categories |
|---|
| ❗ General Information |
| ✉ Web Survey |
| 📞 Voice Survey |
| ❓ Questions |
| ☰ All Categories |

☐ Publish                                                          Version: N/A

Questions
─────────────────────────────────────────────
                    1006              1001
⬇ ⬆   ➦ Jump ▼    ➕ New    ☰ Add    🗑 Remove ▲ ✉📞 Agent overall rating :
    ☐ If answer is Extremely Dissatisfied
    ☐ If answer is Very Dissatisfied
    ☐ If answer is Somewhat Dissatisfied
    ☐ If answer is Somewhat Satisfied
▲ ☐ If answer is Very Satisfied
    ▶ ✉📞 Friendly (V,W) : voice and web question.
    ▲ ✉📞 Helpful :  ～1004
        ☐ If answer is Extremely Dissatisfied
        ☐ If answer is Very Dissatisfied
        ☐ If answer is Somewhat Dissatisfied ～1005
    1002 ↗ ☐ If answer is Somewhat Satisfied
        ☐ If answer is Very Satisfied
        ☐ If answer is Extremely Satisfied ↗
    ☐ If answer is Extremely Satisfied
                                 1008
▲ ✉📞 Comment about agent :

\* An answer to this question is required when delivered as a web survey. This does not apply to voice surveys.

New Record

Question Library ✕

Select a CHECKBOX to add a question to this form

| Quick find | ☐ Select All | ☐ Show only selected |

| | Name |
|---|---|
| ☐ | 📞 Leave Message |
| ☐ | ✉📞 Likely Recommend (NPS) |
| ☐ | ✉📞 New Question |
| ☐ | ✉📞 Pleasant (MC) |
| ☐ | ✉📞 Rate last time (MC) |
| ☐ | ✉📞 Recommend (Q) |
| ☐ | 📞 Scale |
| ☐ | ✉📞 Test Question |
| ☐ | ✉📞 V & W question |
| ☐ | 📞 Valuable Feedback Leave Message |
| ☐ | 📞 Voice Question |

Pleasant (MC)

Description:

Voice Question: On a scale from 1 to 5 where 1 is Rude and 5 is very cheerful, Rate how pleasant the agent was to you.

Web Question: Was the agent pleasant to you?

[ Ok ] [ Cancel ]

FIG. 10B

FIG. 11 opentext™ | Qfiniti

Save  Spell Check  Preview  Publish  Delete

Status: Inactive

Categories
- Survey Credits
- General Information
- Teams and Members
- Filter Criteria
- Survey Parameters
- Email Invite
- All Categories Survey Parameters

* Starting on :        * Ending on :
  3/2/2018              4/2/2018  ⟵ 1302

Do not contact the same person within  30  days for this campaign ⟵ 1304

Delay sending survey for at least  5  minutes after interaction ends ⟵ 1306

Do not send surveys after  1  hours after the interaction ⟵ 1308

Web survey link will expire in  7  Day(s) ⟵ 1310

Only send phone survey between  8:00 AM  –  8:00 PM  ☐ Central Standard Time ⟵ 1312

On following days:  ☐ Sun  ☑ Mon  ☑ Tue  ☑ Wed  ☑ Thu  ☑ Fri  ☐ Sat

Survey Language:  English  ⟵ 1314

New Record

DATA PROCESSING SYSTEMS AND METHODS FOR CONTROLLING AN AUTOMATED SURVEY SYSTEM

RELATED APPLICATION(S)

The present application is a continuation of, and claims a benefit of priority under 35 U.S.C. 120 of, U.S. patent application Ser. No. 15/958,960 filed Apr. 20, 2018, issued as U.S. Pat. No. 11,941,649, entitled "Data Processing Systems and Methods for Controlling an Automated Survey System," which are hereby incorporated herein for all purposes.

TECHNICAL FIELD

This disclosure relates generally to call center surveys, and more particularly to a system and method for managing automated survey campaigns.

BACKGROUND

Large organizations often use call centers staffed by a number of call center agents to provide services to customers or other individuals calling the call center. A call center agent must respond to an incoming call courteously and efficiently to satisfy the calling customer's need and the goals of the organization implementing the call center. To promote effective handling of calls by agents, call centers typically include telecommunications equipment programmed to route incoming calls to call center agents having particular skills or expertise.

In some cases, an entity implementing a call center will seek to elicit feedback from callers through surveys. To this end, a call center may include a computer-implemented survey system configured to provide over-the-phone surveys to incoming callers. The telecommunications equipment of the call center can route incoming calls to the survey system based on the phone number(s) dialed by the callers or agents can transfer callers to the survey system after the agents are done speaking with the callers. Such survey systems require connecting an incoming call to the survey system and surveys are only triggered by incoming calls.

SUMMARY

One embodiment includes a data processing system for controlling automated surveys, the data processing system comprising a processor, a data store and a non-transitory computer readable medium having instructions executable on the processor. The data store stores a plurality of transactions thereon, each transaction comprising transaction metadata and a voice session recording of an inbound call recorded by a call center recording system, the transaction metadata for each transaction comprising an identifier for that transaction. The instructions are executable on the processor for receiving, by the processor, survey campaign information comprising a reference to a survey form, a campaign schedule and a trigger condition applicable to the survey campaign, wherein the trigger condition comprises an operation on a transaction metadata attribute. The instructions are further executable for executing the survey campaign based on a determination that the survey campaign is active according to the campaign schedule.

Executing the survey campaign may comprise identifying, by the processor, a set of transactions from the plurality of transactions that meet the trigger condition; identifying, by the processor, a set of survey targets, the set of survey targets comprising a survey target for each transaction in the set of transactions; generating, by the processor, a worklist for the survey campaign to control conducting of surveys by an automated survey system that is configured to execute the worklist, the worklist comprising a work item for each of the set of transactions and each work item comprising transaction identification data for a transaction from the set of transactions and contact information for the survey target for the transaction corresponding to the transaction identification data in the work item; and providing the worklist to the automated survey system to cause the automated survey system to conduct surveys according to a survey form based on the worklist.

The instructions may be further executable on the processor for receiving, by the processor, a set of survey results from the automated survey system, each survey result comprising transaction identification information for a triggering transaction from the set of transactions and storing, by the processor, survey results for conducted surveys in the data store in association with the set of transactions.

Another embodiment includes a computer program product comprising a non-transitory computer readable medium storing a set of computer executable instructions executable by a processor. The instructions may be executable to receive, by the processor, survey campaign information comprising a reference to a survey form, a campaign schedule and a trigger condition applicable to the survey campaign. The trigger condition may comprise an operation on a transaction metadata attribute.

The instructions may be further executable by the processor to search a data store storing a plurality of transactions, each transaction comprising transaction metadata and a voice session recording of an inbound call recorded by a call center recording system, identify a set of transactions from the plurality of transactions that meet the trigger condition, identify a set of survey targets comprising a survey target for each transaction in the set of transactions and generate a worklist for the survey campaign to control conducting of surveys by an automated survey system that is configured to execute the worklist. The worklist may comprise a work item for each of the set of transactions and each work item may comprise transaction identification data for a transaction from the set of transactions and contact information for the survey target for the transaction corresponding to the transaction identification data in the work item. The instructions may be further executable by the processor to provide the worklist to the automated survey system to cause the automated survey system to conduct surveys based on the worklist and according to a survey form, receive a set of survey results from the automated survey system, each survey result comprising transaction identification data for a triggering transaction from the set of transactions and store survey results for conducted surveys in the data store in association with the triggering transaction.

Yet another embodiment may include a method comprising storing a plurality of transactions in a data store, each transaction comprising transaction metadata and a voice session recording of an inbound call recorded by a call center recording system, the transaction metadata for each transaction comprising an identifier for that transaction. The method may include receiving, by a processor, survey campaign information comprising a reference to a survey form, a campaign schedule and a trigger condition applicable to the survey campaign, wherein the trigger condition comprises an operation on a transaction metadata attribute.

Based on a determination that the survey campaign is active according to the campaign schedule, the processor may execute the survey campaign.

Executing the survey campaign may comprise identifying, by the processor, a set of transactions from the plurality of transactions that meet the trigger condition; identifying, by the processor, a set of survey targets, the set of survey targets comprising a survey target for each transaction in the set of transactions; generating, by the processor, a worklist for the survey campaign to control conducting of surveys by an automated survey system that is configured to execute the worklist, the worklist comprising a work item for each of the set of transactions and each work item comprising transaction identification data for a transaction from the set of transactions and contact information for the survey target for the transaction corresponding to the transaction identification data in the work item; and providing the worklist to the automated survey system to cause the automated survey system to conduct surveys according to a survey form based on the worklist.

The method can further comprise receiving a set of survey results from the automated survey system, each survey result comprising transaction identification information for a triggering transaction from the set of transactions and storing survey results for conducted surveys in the data store in association with the set of transactions.

Embodiments described herein provide a technical advantage over conventional call center survey systems by providing a mechanism for outbound surveys associated with calls where the outbound surveys may occur asynchronously to calls that trigger the surveys.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIG. 6A illustrates an example of a designer operator interface page that includes controls to specify allowable answers.

FIG. 6B illustrates another example of a designer operator interface page that includes controls to specify allowable answers.

FIG. 10A illustrates an example of a designer operator interface page with controls to associate questions from questions with the survey form.

FIG. 10B illustrates an example of an operator interface page displaying a question library.

FIG. 11 illustrates an example embodiment of an operator interface page with controls to allow a designer to define a new survey campaign and provide general survey campaign definition data.

FIG. 13 illustrates an example embodiment of an operator interface page with controls to allow a user to user to specify campaign survey parameters.

FIG. 14 illustrates an example embodiment of an operator interface page for configuring an email invite for a web survey.

DETAILED DESCRIPTION

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

Software implementing embodiments disclosed herein may be implemented in suitable computer-executable instructions that may reside on a computer-readable storage medium. Within this disclosure, the term "computer-readable storage medium" encompasses all types of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, hosted or cloud-based storage, and other appropriate computer memories and data storage devices.

Figure 1:
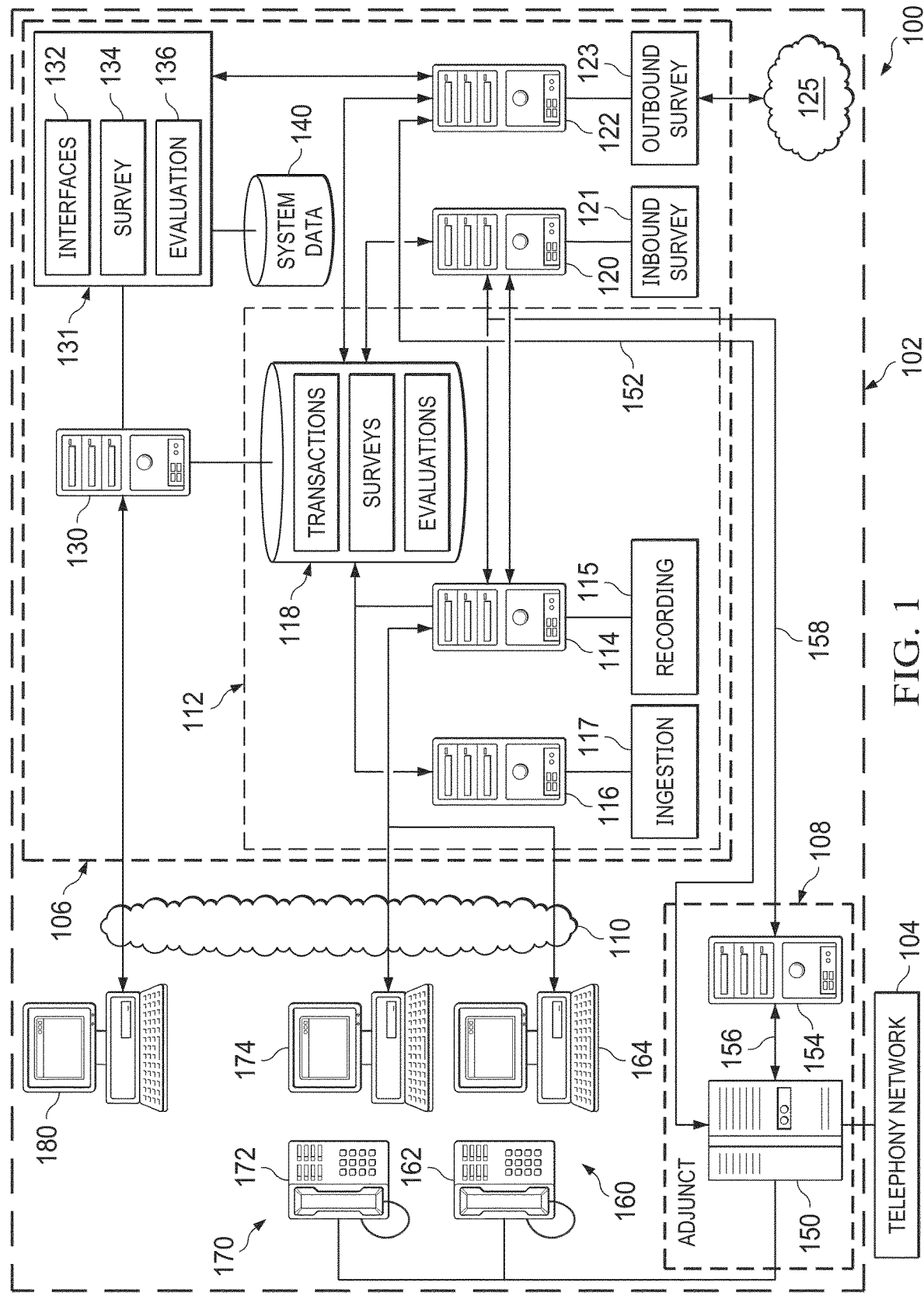
FIG. 1 is a block diagram illustrating one embodiment of a call center system coupled to telephony network.

Embodiments described herein provide an automated survey system with a triggering mechanism to send outbound surveys. FIG. 1 is a block diagram illustrating one embodiment of a call center system 102 coupled to telephony network 104, such as a public switched telephone network (PSTN), VoIP network or other network that can establish call sessions with call center system 102. A call center may receive a large number of calls over network 104 at any given time. These calls are transferred through system 102 and a variety of actions taken with respect to the calls. Among other functionalities, system 102 collects data about the calls, call center or callers during the calls. System 102 stores the audio portion of a call (referred to as a "voice session") in conjunction with data collected for the call.

Call center system 102 comprises a platform 106 coupled to a voice network 108 and a data network 110. Voice network 108 comprises a call routing system 150 to connect incoming calls to terminals in call center system 102 and outgoing calls to telephony network 104. Call routing system 150 may comprise any combination of hardware and/or software operable to route calls. According to one embodiment, call routing system 150 comprises an automatic call distributor (ACD) with interactive voice response (IVR) menus. In addition, or in the alternative, call routing system 150 may include a private branch exchange switch or other call routing hardware or software.

The ACD or other call routing component may perform one or more various functions, such as recognizing and answering incoming calls, determining how to handle a particular call, identifying an appropriate agent and queuing the call, and/or routing the call to an agent when the agent is available. The call routing system 151 may use information about the call, caller or call center or other information gathered by system 102 to determine how to route a call. For example, the call routing system may use the caller's telephone number, automatic number identification (ANI), dialed number identification service (DNIS) information, the caller's responses to voice menus, the time of day, or other information to route a call. The call routing system 150 may communicate with data network 110, a private branch exchange or other network either directly or indirectly, to facilitate handling of incoming calls. The call routing system 150 may also be operable to support computer-telephony integration (CTI).

Call routing system 150 may be coupled to recording server 114 and an inbound survey server 120 of platform 106 by communications lines 152. Lines 152 supports a variety of voice channels that allow platform 106 to monitor and record voice sessions conducted over a voice network 108. Call routing system 150 may also be coupled to a voice instrument 162 at agent workstation 160 and a voice instrument 172 at supervisor workstation 170 via a private branch exchange link, VoIP link or other call link. Platform 106 may receive information over lines 152 regarding the operation of call routing system 150 and the handling of calls received by system 102. This information may include call set-up information, traffic statistics, data on individual calls and call types, ANI information, DNIS information, CTI information, or other information that may be used by platform 106.

Voice network 108 can further include adjunct services system 154 coupled to call routing system 150, call recording server 114 and inbound survey server 120 by data links 156, 158. Adjunct services system 154 may comprise a CTI application or platform, contact control server, or other adjunct device accessible by platform 106 to perform call center functions. Adjunct services system 154 may include a link to other components of the call center's management information system (MIS) host for obtaining agent and supervisor names, identification numbers, expected agent schedules, customer information, or any other information relating to the operation of the call center.

Data network 110 may comprise the Internet or other wide area network (WAN), an enterprise intranet or other a local area network (LAN), or other suitable type of link capable of communicating data between platform 106 and computers 164 at agent workstations 160, computers 174 at supervisor workstations 170 and client computers 180 of other types of users. Data network 110 may also facilitate communications between components of platform 106. Although FIG. 1 illustrates one agent workstation 160, one supervisor workstation 170 and one additional user computer 180, it is understood that call center 102 may include numerous agent workstations 160, supervisor workstations 170 and user computers 180. Computers 164, 174 and 180 may be generally referred to as user client computers.

Platform 106 includes a recording system 112 to record voice sessions and data sessions. In the embodiment illustrated, recording system 112 includes a recording server 114 and an ingestion server 116. Recording server 114 comprises a combination of hardware and/or software (e.g., recording server component 115) operable to implement recording services to acquire voice interactions on VoIP, TDM or other networks, and record the voice sessions. Recording server 114 may also be operable to record data sessions for calls. A data session may comprise keyboard entries, screen display and/or draw commands, video processes, web/HTTP activity, e-mail activity, fax activity, applications or any other suitable information or process associated with a client computer. To facilitate recording of data sessions, agent computers 164 or supervisor computers 174 may include software to capture screen interactions related to calls and send the screen interactions to recording server 114. Recording server 114 stores session data for voice and data sessions in transaction data store 118.

Ingestion server 116 comprises a combination of hardware and software (e.g., ingestion server component 117) operable to process voice session recordings recorded by recording server 114 or live calls and perform speech-to-text transcription to convert live or recorded calls to text. Ingestion server 116 stores the transcription of a voice session in association with the voice session in call data store 118.

Platform 106 further comprises an inbound survey server 120. Survey server 120 comprises a combination of hardware and software (e.g., inbound survey component 121) operable to provide post-call surveys to callers calling into call center 102. For example, inbound survey server 120 can be configured to provide automated interactive voice response (IVR) surveys. Call routing system 150 can route an inbound call directly to inbound survey server 120, transfer a call from an agent to inbound survey server 120 or transfer calls from inbound survey server 120 to an agent. Survey data for completed surveys can be stored in data store 118.

In operation, call routing system 150 initiates a session at call center system 102 in response to receiving a call from telephony network 104. Call routing system 150 implements rules to route calls to agent voice instruments 162, supervisor voice instruments 172, recording server 114 or inbound survey server 120. Depending on the satisfaction of a variety of criteria (e.g., scheduling criteria or other rules), routing system 150 may establish a connection using lines 152 to route a call to a voice instrument 162 of an agent workstation 160 and recording server 114. Routing system 150 may also establish a connection for the call to the voice instrument 172 of a supervisor.

Recording server 114 stores data received for a call from adjunct system 154 and routing system 150, such as call set-up information, traffic statistics, call type, ANI information, DNIS information, CTI information, agent information, MIS data. In some cases, recording server 114 may also store a recording of the voice session for a call. Additionally, recording server may record information received from agent computer 164 or supervisor computer 174 with respect to the call such as screen shots of the screen interactions at the agent computer 164 and field data entered by the agent. For example, platform 106 may allow an agent to tag a call with predefined classifications or enter ad hoc classifications and recording server may store the classifications entered by the agent for a call.

Recording server 114 stores data and voice sessions in data store 118, which may comprise one or more databases, file systems or other data stores, including distributed data stores. Recording server 114 stores a voice session recording as a transaction in data store 118. A transaction may comprise transaction metadata and associated session data. For example, when recording server 114 records a voice session, recording server 114 can associate the recording with a unique transaction id and store a transaction having the transaction id in data store 118. A data session may also be linked to the transaction id. Thus, the transaction may further include a recording of a data session associated with the call, such as a series of screen shots captured from the agent computer 164 during a voice session. The transaction may also include a transcript of the voice session recording created by ingestion server 116. In some embodiments, the voice session may be recorded as separate recordings of the agent and caller and thus, a transaction may include an agent recording, a customer recording, a transcript of the recording of the agent (agent transcript) and a transcript of the recording of the customer (inbound caller transcript). According to one embodiment, the voice session recording, transcript of the voice session or data session recording for a call may be stored in a file system and the transaction metadata stored in a database with pointers to the associated files for the transaction.

Transaction metadata can include a wide variety of metadata stored by recording server 114 or other components. Transaction metadata may include, for example metadata provided to recording server 114 by routing system 150 or adjunct system 154, such as call set-up information, traffic statistics, call type, ANI information, DNIS information, CTI information, agent information, MIS data or other data. For example, the transaction metadata for a call may include call direction, line on which the call was recorded, ANI digits associated with the call, DNSI DNIS digits associated with the call, extension of the agent who handled the call, team that handled the call (e.g., product support, finance), whether the call had linked calls, name of agent who handled the call, agent team or other data. The transaction metadata may further include data received from agent computers 164, supervisor computers 174, or other components, such as classifications (pre-defined or ad hoc tag names) assigned to the call by a member, classification descriptions (descriptions of predefined or ad hoc tags assigned by a call center member to a call) or other transaction metadata. The transaction metadata may further include call statistics collected by recording server 114, such as the duration of a voice session recording, time voice session was recorded and other call statistics. Furthermore, other components may add to the transaction metadata as transactions are processed. For example, transaction metadata may include whether a transaction is part of a survey campaign. Transaction metadata may be collected when a call is recorded, as part of an evaluation process, during a survey campaign or at another time. As one of skill in the art will appreciate, the foregoing transaction metadata is provided by way of example and a call center system may store a large variety of transaction metadata.

Call routing system 150 may also route or transfer inbound calls to survey server 120. Automated survey sessions may be recorded by survey server 120 and stored as completed surveys in data store 118.

Intelligent data processing system 130 provides a variety of services such as support for call recording, performance management, real-time agent support, and multichannel interaction analysis. Intelligent data processing system 130 can comprise one or more computer systems with central processing units executing instructions embodied on one or more computer readable media where the instructions are configured to perform at least some of the functionality associated with embodiments of the present invention. These applications may include a data application 131 comprising one or more applications (instructions embodied on a computer readable media) configured to implement one or more interfaces 132 utilized by the data processing system 130 to gather data from or provide data to client computing devices, data stores (e.g., databases or other data stores) or other components. Interfaces 132 may include interfaces to connect to various sources of unstructured information in an enterprise in any format, including audio, video, and text. It will be understood that the particular interface 132 utilized in a given context may depend on the functionality being implemented by data processing system 130, the type of network utilized to communicate with any particular system, the type of data to be obtained or presented, the time interval at which data is obtained from the entities, the types of systems utilized. Thus, these interfaces may include, for example web pages, web services, a data entry or database application to which data can be entered or otherwise accessed by an operator, APIs, libraries or other type of interface which it is desired to utilize in a particular context.

Data application 131 can comprise a set of processing modules to process data obtained by intelligent data processing system 130 (obtained data) or processed data to generate further processed data. Different combinations of hardware, software, and/or firmware may be provided to enable interconnection between different modules of the system to provide for the obtaining of input information, processing of information and generating outputs. In the embodiment of FIG. 1, data application 131 includes a survey module 134 configured to provide a survey campaign management system that allows survey designers to design surveys and configure outbound survey campaigns. Data application 131 further includes an evaluation module 136 that allows an evaluation designer to design and deploy evaluation forms used by agents or evaluators to evaluate recordings.

Intelligent data processing system 130 can include a data store 140 that stores various templates, files, tables and any other suitable information to support the services provided by data processing system 130. Data store 140 may include one or more databases, file systems or other data stores, including distributed data stores.

Intelligent data processing system 130 processes transactions in data store 118 to identify transactions that qualify for an active survey campaign and provides worklists of transactions for active survey campaigns to outbound survey system 122. Based on the worklists, outbound survey system 122 invites customers to participate in surveys and receives survey responses. Survey results, including completed surveys, can be stored in data store 118.

An outbound survey system 122 coupled to platform 106 runs an outbound survey component 123 to deliver outbound surveys. The outbound surveys can be provided to customers based on prior transactions. For example, platform 106 can use the metadata from calls into the call center 102 to determine if a survey is to be sent and if so, what survey to offer the customer.

Outbound survey system 122 is configured to provide surveys over multiple delivery channels, for example, over a voice channel or over a data network. In one embodiment, outbound survey system 122 is coupled to call routing system 150 by telephony lines 152 so that outbound survey system 122 can connect to telephony network 104 to provide voice surveys. According to another embodiment, outbound survey system 122 is a remote system that connects to a telephone network through telecommunications equipment that is not part of call center 102. Outbound survey system is further connected to a data network 125, such as a WAN, LAN, the Internet or a combination thereof, to provide web surveys to customer computers. Outbound survey system 122 can be coupled to other components of platform 106 by data network 110, data network 125 or other data network. According to one embodiment, outbound survey system 122 can be implemented by a cloud system.

Data store 118 can store survey records for surveys. A survey record can comprise recipient survey answers and survey metadata. The survey metadata may include information about the agent who handled the call that triggered the survey (agent name, extension or other agent information), information for the recipient who took the survey (customer name, number or other customer information), the status of the survey (e.g., abandoned, survey completed, survey declined, error or other status), time it took to answer each survey question, and other metadata.

Data store 118 may also store evaluations. Platform 106 may include an evaluation feature that allows an evaluator to evaluate an agent's performance or the agent to evaluate his or her own performance. An evaluation may be performed based on a review of a recording. Thus, an evaluation score may be linked to a recording in data store 118.

Figure 2:
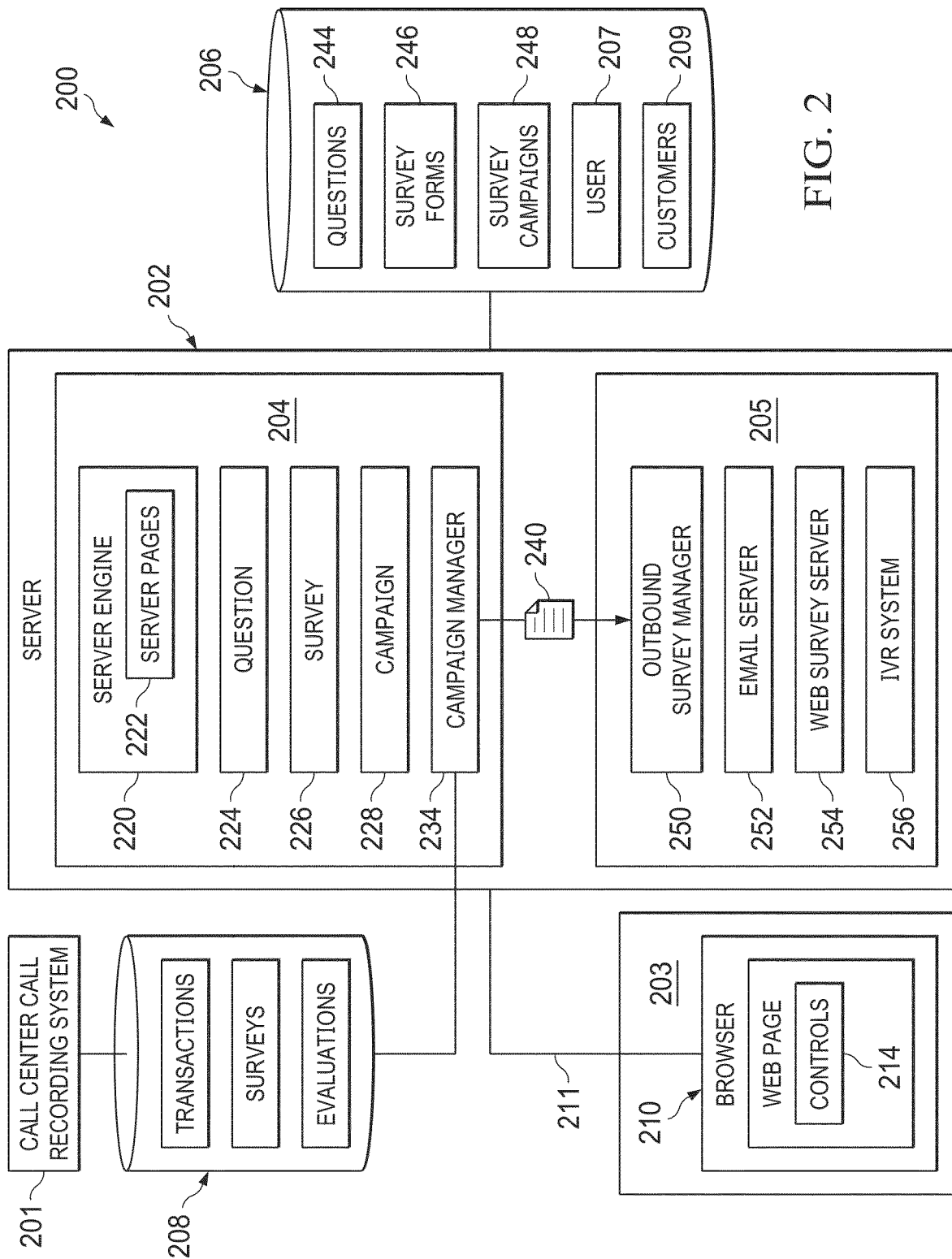
FIG. 2 is a diagrammatic representation of one embodiment of a survey campaign system.

FIG. 2 is a diagrammatic representation of one embodiment of a survey campaign system 200 operable to access transactions from a call center call recording system 201. Survey campaign system 200 comprises a server tier 202, a client tier 203, a data store 206 and a data store 208. The client tier 203 and server tier 202 can be connected by a network, such as the Internet or other WAN, an enterprise intranet or other LAN, or other suitable type of link capable of communicating data between the client and server tiers. According to one embodiment, for example, server tier 202 and data store 206 may be implemented by intelligent data processing system 130, outbound survey system 122 and data store 140, client tier 203 may be implemented on one or more client computers, such as computers 180, and data store 208 may be an example of data store 118 that stores a set of transactions, survey results and evaluations. Each transaction may comprise transaction metadata and a voice session recording of an inbound call recorded by a call center recording system. A transaction may further include a data session recording. The transaction metadata for each transaction can comprise an identifier for that transaction and other metadata.

Server tier 202 comprises a combination of hardware and software to implement platform services components 204 and outbound survey system components 205. Platform services components 204 comprise sever server engine 220, server-side question component 224, server-side survey component 226, server side campaign component 228 and campaign manager 234 and outbound survey system components 205 comprise outbound survey manager 250, email server 252, web survey server 254 and IVR system 256. Client tier 203 comprises a combination of hardware and software to implement an operator interface 210 for defining survey forms and campaigns. Data store 206 may comprise one or more databases, file systems or other data stores, including distributed data stores. Data store 206 may include user data 207 and customer data 209. User data 207 can comprise data regarding users of a call center platform, such as usernames, roles, teams, permissions and other data about users (e.g., agents, supervisors, designers). Customer data 209 can include data regarding customers of the entity implementing a call center, such as names, email addresses, phone numbers, physical addresses and other information about customers. Data store 206 may further include data to support services provided by server tier 202, such as questions 244, survey forms 246 and survey campaign data 248.

Client tier 203 comprises an operator interface 210 that includes controls 214 to allow a survey designer to define survey forms and configure survey campaigns. According to one embodiment, operator interface 210 can comprise one or more web pages that include scripts to provide controls 214. To this end server tier 202 can comprise a sever server engine 220 configured with server pages 222 that include server-side scripting and components. The server-side pages 222 are executable to deliver application pages to client tier 203 and process data received from client tier 203. The server-side pages 222 may interface with server-side question component 224, survey component 226 and campaign component 228 to provide an operator interface 210 that allows a designer (a user with appropriate permissions) to define questions, survey forms or survey campaigns.

In general, survey instances (surveys) are created from survey forms (templates) that define the questions and other content, such as opening and closing greetings, in the surveys. A survey campaign comprises rules for sending surveys according to survey forms to survey targets (e.g., customers). According to one embodiment, questions, survey forms and campaigns may be implemented as objects (e.g., question objects, survey form objects and campaign objects) that contain data and implement stored procedures. Thus, question component 224 may comprise question objects, survey component 226 may comprise survey form objects and campaign component 234 may comprise campaign objects.

Survey questions, survey forms incorporating the survey questions and survey campaigns utilizing the survey forms can be defined via designer interface 210. According to one embodiment, one or more pages 222 interact with question component 224 to provide interface pages for defining questions 244 and to store questions 244, survey component 226 to provide interface pages for defining survey forms 246 and to store survey forms 246 and campaign component 228 to provide interface pages for defining campaigns 248 and to store campaigns 248. FIGS. 3-14 illustrate example embodiments of an operator interface for designing questions, survey forms and survey campaigns.

Figure 3:
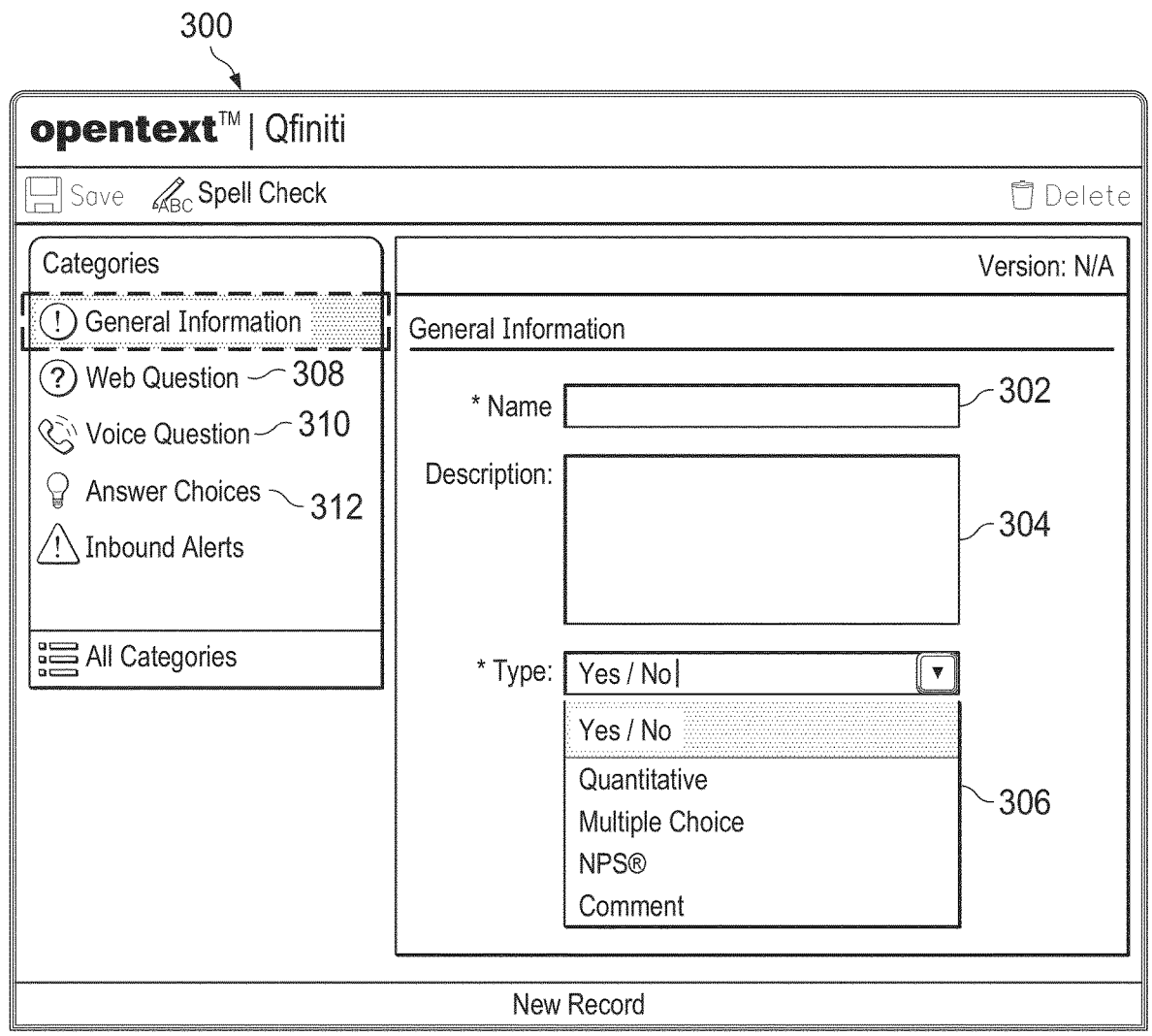
FIG. 3 illustrates one embodiment of an operator interface to allow a designer to create a new question and provide general question data.

FIG. 3 illustrates an example of an operator interface page 300 with controls to allow a designer to create a new question and provide general question data that is the same regardless of delivery channel. In one embodiment, creating a new question may create a new question object. Form field 302 allows a user to input a question name, form field 304 allows the user to input a description of the question and menu 306 allows the user to select a type of question from a set of predefined question types. For example, a question may be a yes/no question (survey recipient can only answer Yes or No), multiple choice (survey recipients select an answer from a list of options), general comment or other type of question. The user may also select to configure the answer choices for the question (e.g., by selecting menu item 312).

According to one embodiment, a portion of the question data, referred to herein as channel specific question data, may be specified for use with surveys delivered on a particular delivery channel. In the embodiment illustrated, for example, the user can select menu item 308 to proceed to an interface page that allows the user to input web specific data for the question or menu item 310 to proceed to an interface page that allows the user to input voice channel specific data for the question.

Figure 4:
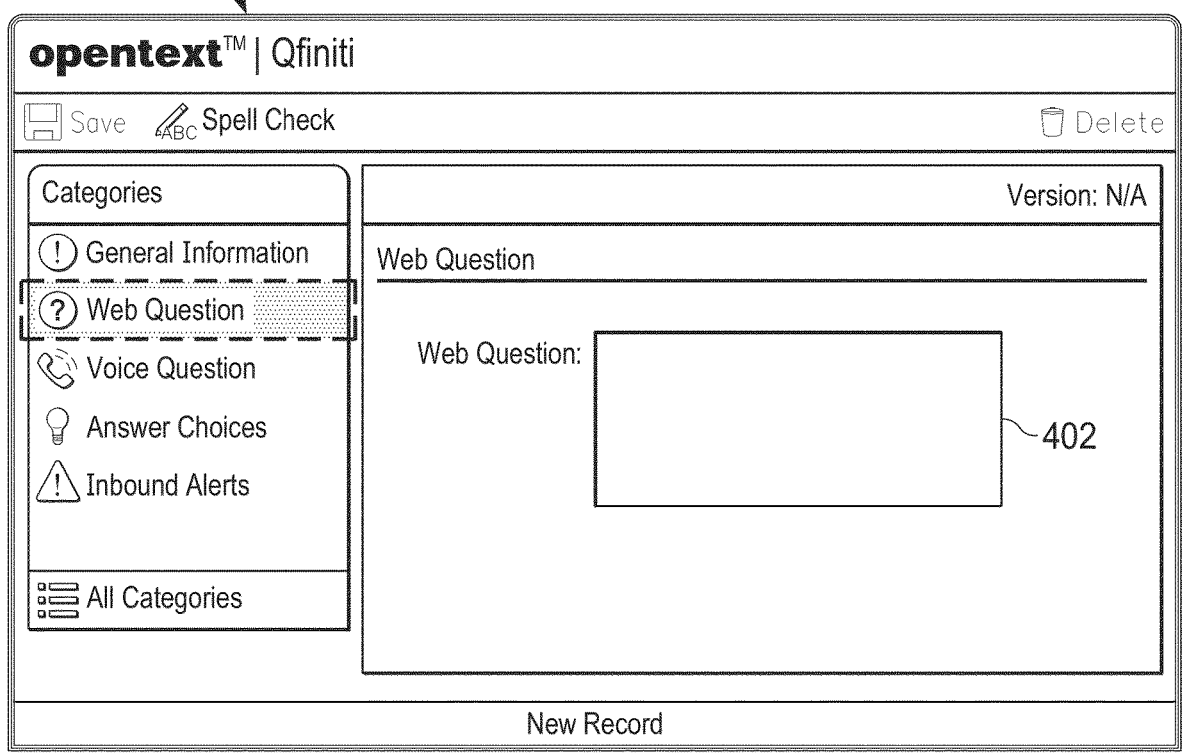
FIG. 4 illustrates an example of a designer operator interface page with controls to input web specific data for the question.
Figure 5:
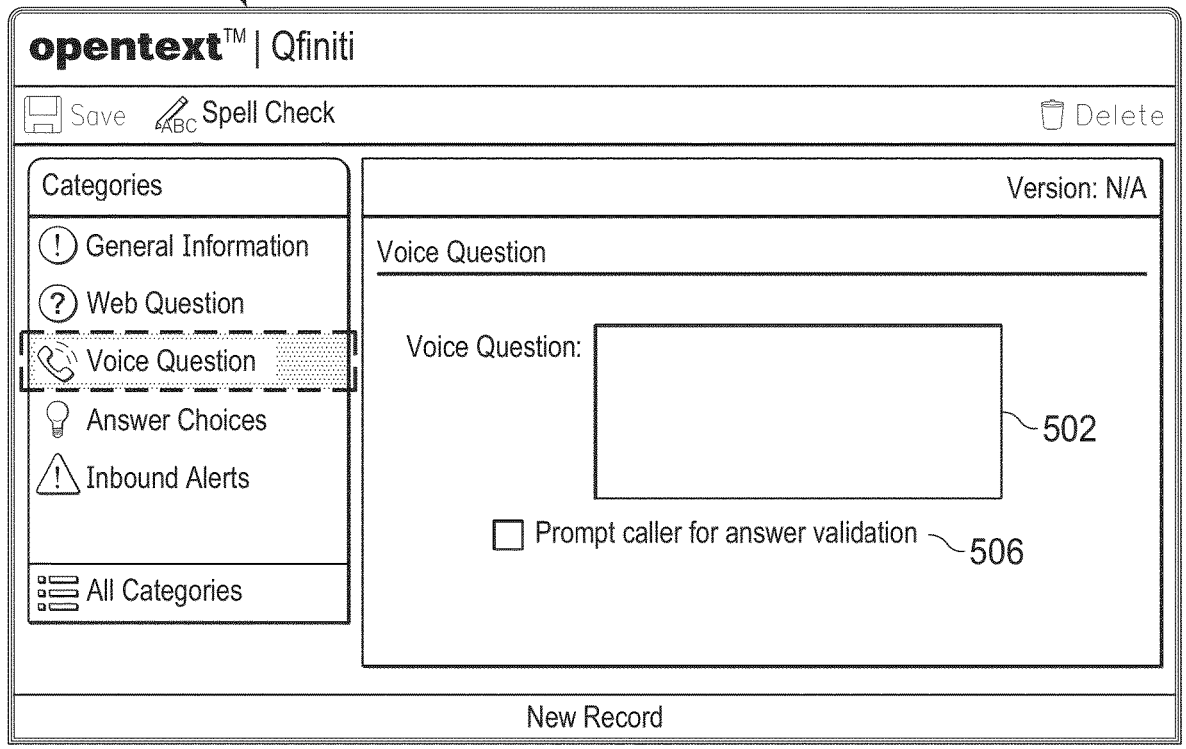
FIG. 5 illustrates an example of a designer operator interface page with controls to input voice question data.

FIG. 4 illustrates an example of a designer operator interface page 400 with controls to input web specific data for the question. Text box 402 provides a control that allows the user to input the text of the question that will appear as a web question on survey delivered as a web page survey. FIG. 5, on the other hand, illustrates an example of a designer operator interface page 500 with controls to input voice question data. Text box 502 provides a control that allows the user to input the text of the question. The text of the question may be translated to voice by an automated speech system as part of a voice survey. In other implementations, a user may attach a voice file for the question. Control 506 allows a user to indicate whether the survey system should prompt the survey taker to confirm his or her answer. Selecting this option causes the outbound survey system to ask a recipient of a survey that includes the question to validate the response before moving to the next question. If the recipient's response was invalid, the survey system can repeat the question and then prompt the recipient to answer again.

FIGS. 6A and 6B illustrate examples of a designer operator interface page 600 that includes controls to specify allowable answers. The answer type selected using the interface of FIG. 3 determines the content that is displayed in the answer choice interface page 600. For a yes/no question or multiple choice question, the selectable answers can correspond to numbers that may be entered using a touch tone phone or via voice. For example, for a yes/no question, the recipient can only answer Yes or No. The allowable answers for this question type may default to 1 and 2, where 1 represents Yes, and 2 represents No as shown in FIG. 6A. For a multiple choice question, the recipient can respond by selecting a number from a set of selected numbers, where each number corresponds to an answer. In FIG. 6B, the designer can select the check boxes (0-11) for each valid answer. For example, for a quantitative question of "How would you rate product x on a scale of 1 to 5, with 5 being the highest rating?" The designer may select check boxes 1-5 and label the choices accordingly. As another example, a multiple choice question may ask a recipient for a satisfaction rating where the numbers correspond to ratings. For example, a voice question may be, "How satisfied are you with Product x? Press 1 if you are very satisfied, press 2 if you are somewhat satisfied, press 3 if you are somewhat dissatisfied, press 4 if you are very dissatisfied" and the corresponding web question may be "How satisfied are you with Product x? Select option 1 if you are very satisfied, select option 2 if you are somewhat satisfied, select option 3 if you are somewhat dissatisfied, select option 5 if you are very dissatisfied" In this example, the designer can select numbers 1-4 in the interface of FIG. 6B and label the numbers with text labels accordingly.

Returning briefly to FIG. 2, server tier 202 may thus receive survey form data based on interactions with operator interface 210. A survey form configured via operator interface 210 can be persisted as a survey form 246 in data store 206. Survey forms 246 may be stored as records in one or more tables in a database, files in a file system or combination thereof according to another data storage scheme. Each survey form 246 can comprise a variety of survey form data, such as, but not limited to, unique identifier, name, description, survey form text, associated questions, a question order and branching rules. According to one embodiment, each survey form 246 in data store 206 may comprise the attributes of a survey form object. In some cases, portions of the survey form data may be channel specific such as, for example, web specific survey form text, voice specific survey form text and channel specific parameters. Further, a survey form 246 may comprise voice recordings of questions or survey form text.

Survey forms define the surveys to which recipients respond. A survey form comprises one or more questions to be included surveys according to the form, configuration parameters and other information. A survey designer can design a survey form via operator interface 210. FIGS. 7-10 illustrate example embodiments of operator interface pages for designing survey forms.

Figure 7:
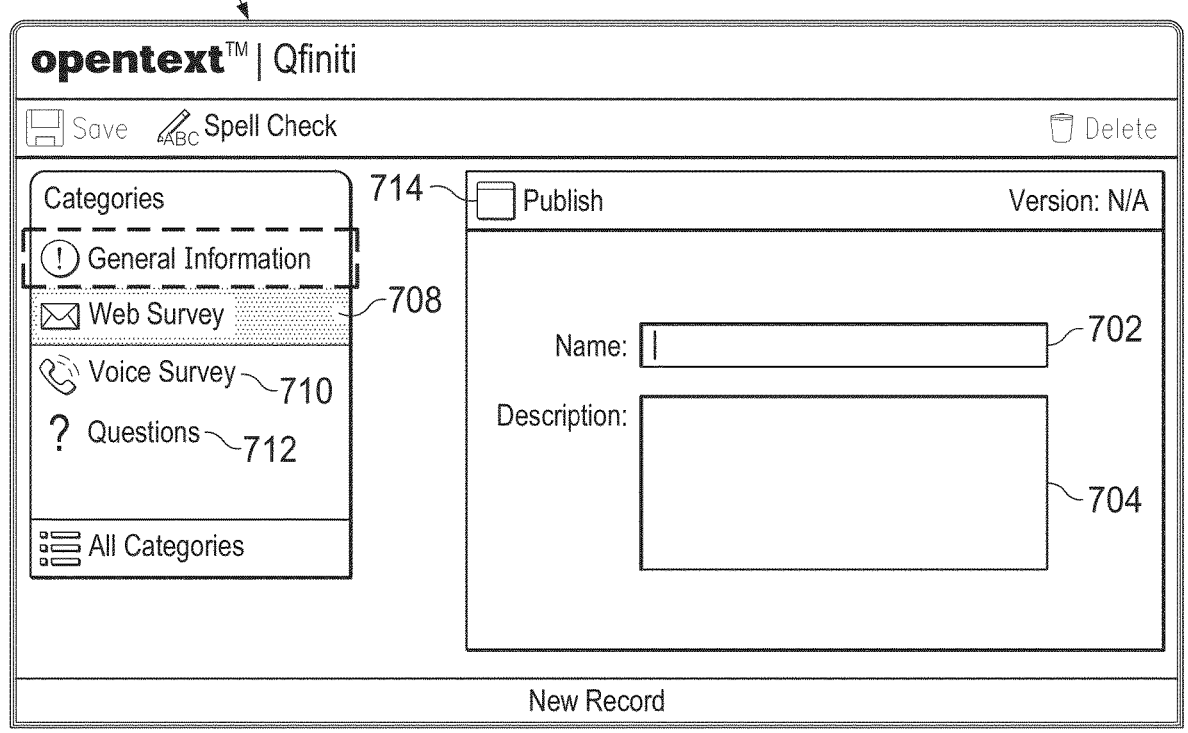
FIG. 7 illustrates an example embodiment of an operator interface page with controls to allow a designer to define a new survey form and provide general survey form definition data.

FIG. 7 illustrates an example embodiment of an operator interface page 700 with controls to allow a designer to define a new survey form and provide general survey form definition data. Form field 702 allows a user to input a survey form name and form field 704 allows the user to input a description of the survey form. The user may also select to associate questions from questions 244 with the survey form (e.g., by selecting menu item 712). By selecting publish control 714, the user can indicate that the survey form is ready to be used in a survey campaign.

According to one embodiment, a survey form comprises data tailored for each of a plurality of delivery channels. In the embodiment illustrated, for example, the user can select menu item 708 to proceed to an interface page via which the user can specify web specific data or menu item 710 to proceed to an interface page via which the user can specify voice channel specific data.

Figure 9:
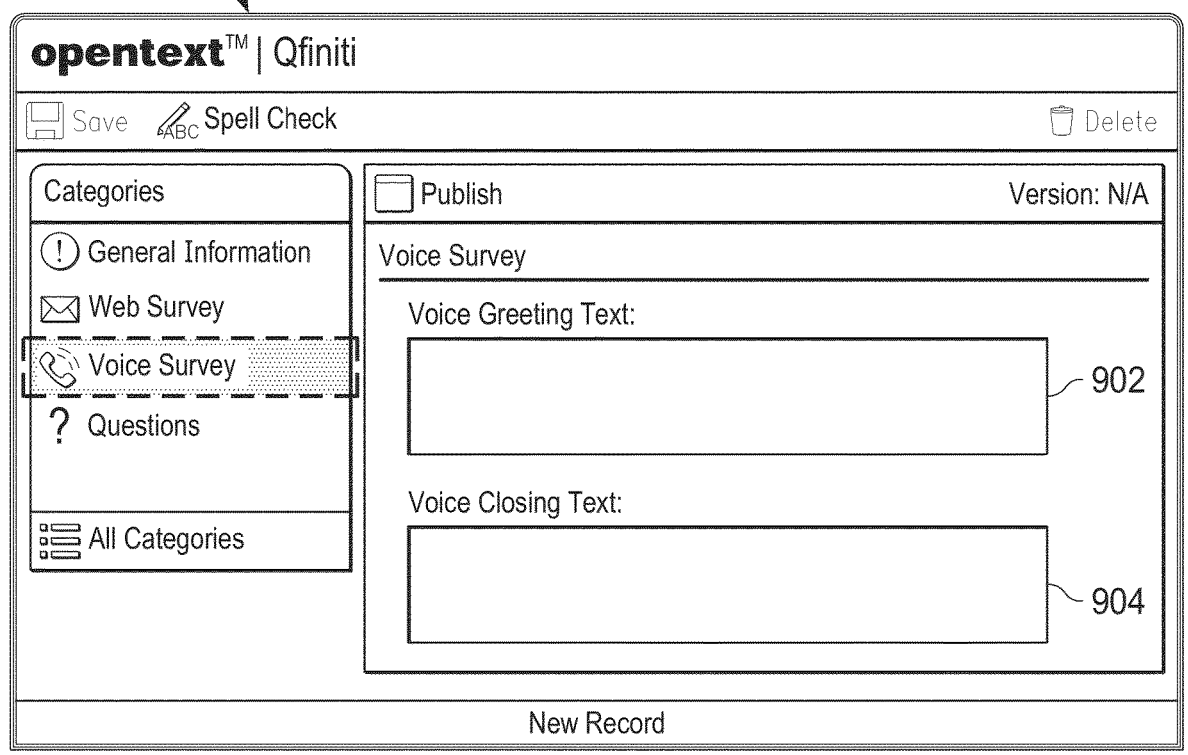
FIG. 9 illustrates an example of a designer operator interface page with controls to configure a survey form for a voice survey.
Figure 8:
FIG. 8 illustrates an example of a designer operator interface page with controls to configure a survey form for a web survey.

FIG. 8 illustrates an example of a designer operator interface page 800 with controls to configure a survey form for a web survey. Text boxes 802 and 804 provide controls that allow the user to input greeting and closing text for the web survey. FIG. 9, on the other hand, illustrates an example of a designer operator interface page 900 with controls to configure a survey form for a voice survey. Text boxes 902 and 904 provide controls that allow the user to input the greeting and closing text for the survey form for use as a voice survey. The voice survey text may be translated to voice by an automated speech system as part of a voice survey. In other implementations, a human can record a voice file for the voice survey text.

FIG. 10A illustrates an example of a designer operator interface page 1000 with controls to associate questions from questions 244 with the survey form. For example, when the user selects the "Questions" menu item, the user can be presented with interface page 1000 of FIG. 10A. Interface page 1000 includes controls 1001 that allow the user to add new questions or existing questions to the survey form to create a list 1002 of questions associated with the survey form. Responsive to the user selecting to add a question (e.g., responsive to user interaction with add control 1001), the user can be presented with a question library interface page 1050 (FIG. 10B) that provides controls to allow the user to select questions from the library of questions 244 to add to the survey form. Based on the inputs reviewed via interaction with interface page 1050, the survey campaign system associates questions with the survey form.

Returning to FIG. 10A, survey questions selected for the survey are presented in list 1002. The designer may rearrange the order of questions via drag and drop or other control. Interface page 1000 can further include controls to display the available answers for a question (e.g., via drop-down menu or other control). For example, for the question 1004 "Helpful," the interface page 1000 displays the available answers defined for the question in a drop down menu. In this example, the allowable answers defined in the question named "Helpful" are labelled "Extremely Dissatisfied," "Very Dissatisfied," "Somewhat Dissatisfied", "Somewhat Satisfied," "Very Satisfied" and "Extremely Satisfied."

By default, if the survey form is used for a survey on a particular channel, the survey form will be processed to present, to a survey recipient, the questions for that channel in the sequence defined in list 1002. However, the designer can also add branching instructions to survey forms that control how survey recipients proceed through surveys according to the survey form.

By adding question branching rules, a designer can create surveys with increased depth and usefulness. Branching rules allow the designer to branch questions into more detailed follow-up questions based on the answer given by a recipient. For example, the survey form can be configured such that if a recipient gives an answer that indicates he or she is unhappy with a product, the survey can then ask the recipient detailed questions to find the reason for dissatisfaction.

In the embodiment illustrated, interface 1000 includes a "jump" tool 1006 that allows the user to define question branching. The designer can select an allowable answer to a question and jump tool 1006. The designer may then be presented with an interface that allows the designer to select another question in list 1002 that is the jump target. The survey designer can specify that the survey should skip to a target question if the survey recipient responds with answer 1008 (e.g., "Extremely Satisfied") to the "Helpful" question 1004. The target question may be prior to or subsequent to the current question in the list (e.g., answer 1008 may branch to a question before or after the "Helpful" question 1004). Branching rules can be associated with none, some or all of the allowable answers for a question. Each allowable answer for a question can be associated with a different jump (branching rule) or multiple allowable answers may be associated with the same branching rule. Thus, an allowable answer to a question may be linked to another question in the survey form such that a survey can branch based on the answer to the question provided by the survey recipient.

Returning briefly to FIG. 2, server tier 202 may thus receive survey form data based on interactions with operator interface 210. A survey form configured via operator interface 210 can be persisted as a survey form 246 in data store 206. Survey forms 246 may be stored as records in one or more tables in a database, files in a file system or combination thereof according to another data storage scheme. Each survey form 246 can comprise a variety of survey form data, such as, but not limited to, unique identifier, name, description, survey form text, associated questions, a question order and branching rules. According to one embodiment, each survey form 246 in data store 206 may comprise the attributes of a survey form object. In some cases, portions of the survey form data may be channel specific such as, for example, web specific survey form text, voice specific survey form text and channel specific parameters. Further, a survey form 246 may comprise voice recordings of questions or survey form text.

Figure 11:
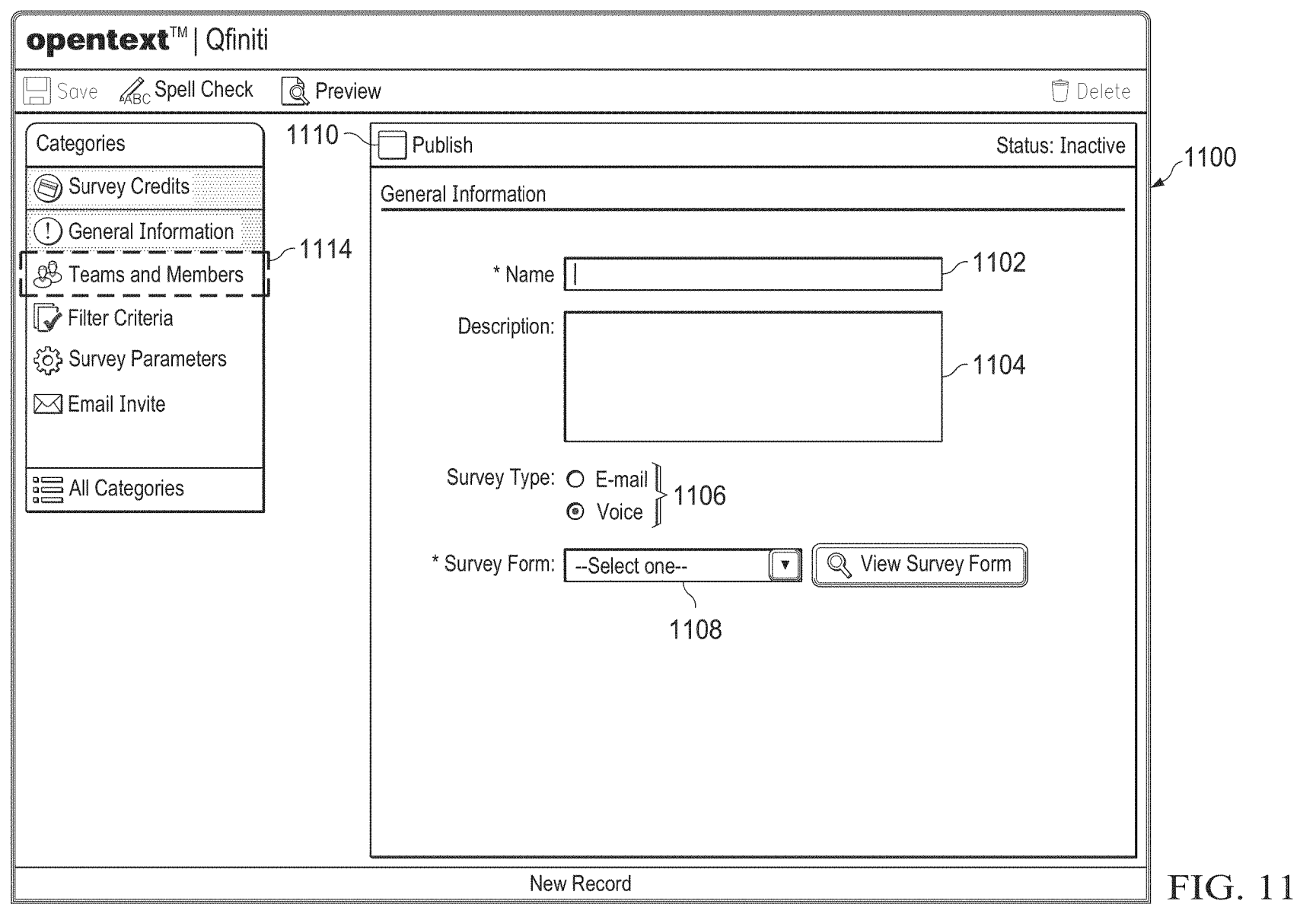
Figure 12:
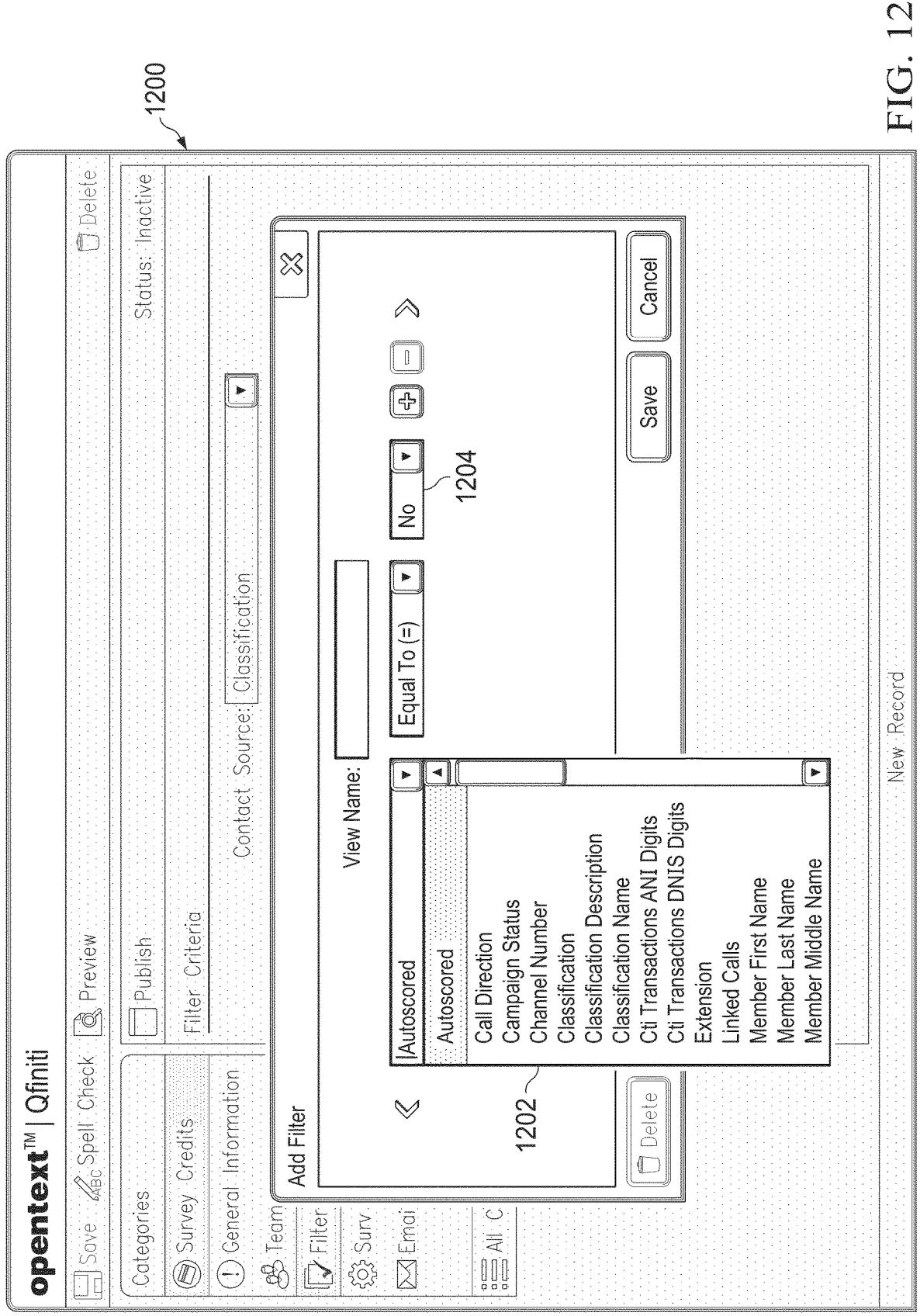
FIG. 12 illustrates an example embodiment of an operator interface page with controls to allow a user to input filter criteria for the survey campaign.

A survey designer can further define survey campaigns via operator interface 210. The designer can configure these campaigns to watch for specific criteria—such as call recordings with <x> data points, for <x> product, <x> number of days, etc.—and then schedule the timeframe during which the surveys are sent based on those criteria. FIGS. 11-13 illustrate example embodiments of operator interface pages for designing survey campaigns.

FIG. 11 illustrates an example embodiment of an operator interface page 1100 with controls to allow a designer to define a new survey campaign and provide general survey campaign definition data that is the same regardless of delivery channel. Form field 1102 allows a user to input a survey campaign name, form field 1104 allows the user to input a description of the survey campaign, type selection control 1106 allows the user to input a survey campaign channel (e.g., web or voice) and survey form selection control 1108 allows the user to associate a survey form 246 with the survey campaign. While the examples of an e-mail channel and voice channel are used for the sake of example, other embodiments may provide survey campaigns using other channels, such as SMS, chat or other channels. By selecting publish control 1110, the user can indicate that the survey campaign should be executed.

A user may be presented with controls that allow the user to select which transactions will be evaluated for possible inclusions in a survey campaign. For example, by selecting 1114, the designer may be presented with an interface page with controls to specify the teams or team members for which transactions will be evaluated (e.g., such that a survey campaign will only evaluate transactions associated with the selected team or team members).

According to one embodiment, a designer can also configure a campaign to watch for specific types of transactions (recordings). For example, operator interface 210 can provide controls to allow a user to specify trigger conditions for sending a survey to a survey target.

According to one embodiment, the trigger conditions comprise filter criteria on transaction metadata. Examples of filter criteria include, but are not limited to:

Autoscored—Yes/No—whether a recording has been evaluated by a scoring process of the call center platform. For example, certain call center platforms such as OPENTEXT QFINITI by OPEN TEXT of Waterloo, Ontario Canada provide autoscoring of recorded calls.

Autoscore value—a score value assigned by the scoring process of the call center platform.

Classification—a "tag" that has been associated to the recording (e.g., by the supervisor or agent as part of a data session). For example, an agent may classify a call based on the topic of conversation, sentiment or emotion as discussed above.

Extension—the telephone extension of the agent that serviced a call. For example, a survey designer can design a survey campaign for customers who had calls serviced by an agent or agents using a particular extension.

Team—a defined team of which an agent is part. For example, a survey designer may wish to design a survey campaign for customers who had calls serviced by members of a "Product Support" team.

Recording date—date that a call was recorded by the call center platform. For example, a survey designer may design a survey campaign for customers for whom calls were recorded in the last seven days.

Recording plan type—as would be appreciated by those of skill in the art, some call center platforms, such as QFINITI support recording plans of various types. According to one embodiment, a survey designer can design a survey campaign for customers who had calls recorded according to a particular recording plan type.

Transaction duration—length of the recording. For example, a survey designer can design a survey campaign for customers that experienced calls of longer than x minutes.

The foregoing filter criteria are provided by way of example and other filter criteria may be used. Moreover, a combination of filter criteria may be defined for a survey campaign.

FIG. 12 illustrates an example embodiment of an operator interface page 1200 with controls to allow a user to input trigger conditions, for example filter criteria, for the survey campaign. In the embodiment of FIG. 12, a filter criterion comprises a rule and an indication of the metadata to which the criterion applies. Control 1202 allows the user to select a transaction metadata attribute to which filter rules will be applied and controls 1204 provide inputs for a filter rule to be applied to the metadata. According to one embodiment, a trigger condition may be specified as Boolean operation or other operation on a transaction metadata attribute.

FIG. 13 illustrates an example embodiment of an operator interface page 1300 with controls to allow a user to user to specify campaign survey parameters. Campaign survey parameters may include campaign scheduling parameters that control when the campaign is active. Interface page 1300, for example, includes scheduling controls 1302 that allow the designer to input a schedule of when the campaign will be active (e.g., controls to specify a start date/time and an end date/time for the campaign).

Campaign survey parameters may also include survey scheduling parameters that control when surveys according to the campaign may be sent or completed. Control 1304, for example, allows the designer to input a do not contact time period. The do not contact time period sets a time period for the survey to not contact the same person (e.g., phone number or email address) for the survey campaign. Control 1306 allows the designer to input a delay time period that the system should wait after a particular interaction (call) to send a survey. Control 1308 allows the user to input a maximum time after an interaction that a survey should be sent based on the campaign. Control 1310 allows the designer to indicate when a link to a web survey should expire after contacting the survey target about the survey. Controls 1312 provide inputs for specifying allowable times (times/days) to send surveys according to the campaign.

Campaign survey parameters may include other parameters to control sending of surveys according to the campaign. Control 1314, for example, provides an input for specifying the language of surveys sent according to the campaign.

Figure 14:
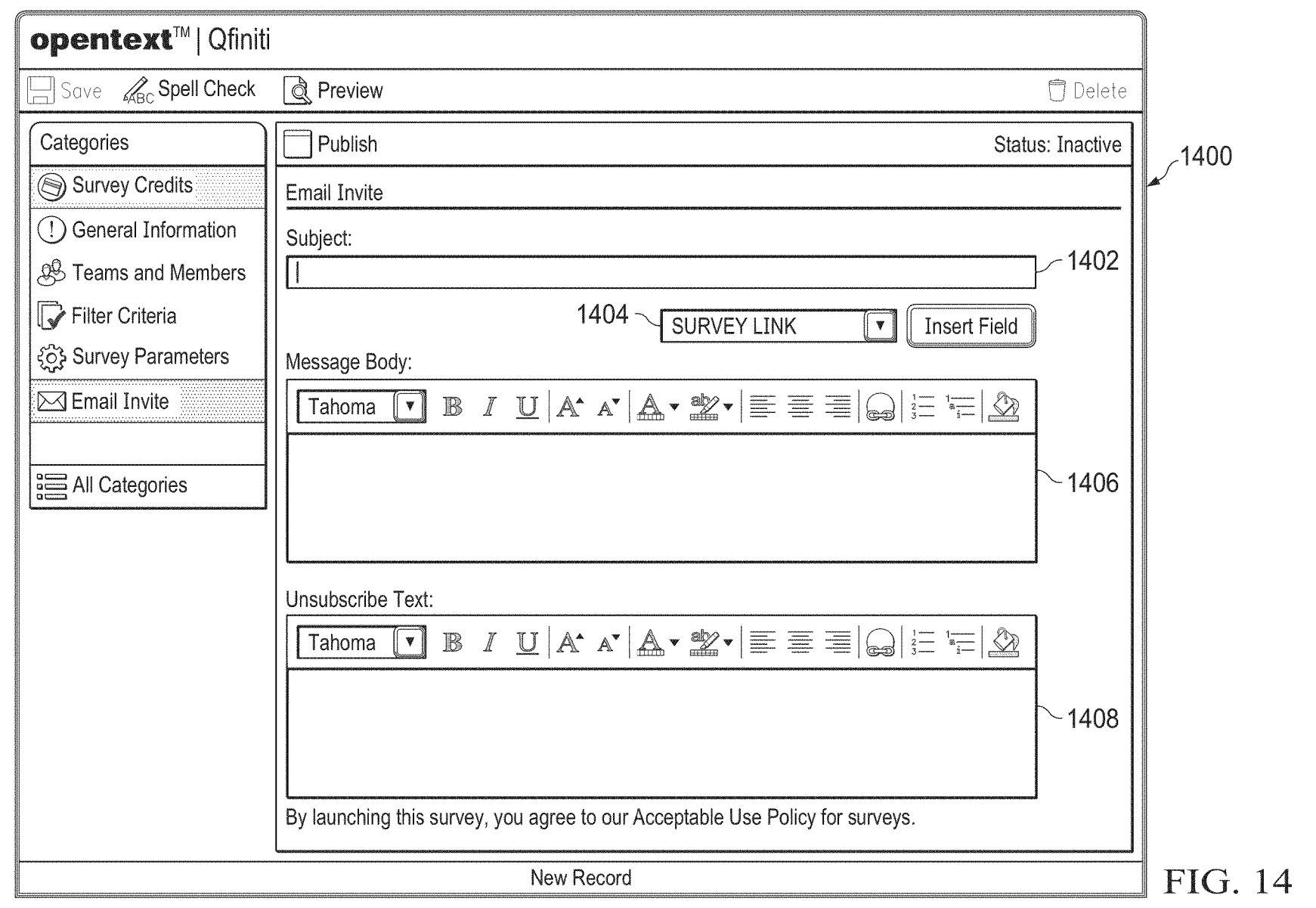

In the case of a web survey, an email invite may be constructed with subject and body information and a link to take the survey. FIG. 14 illustrates an example embodiment of an operator interface page 1400 for configuring an email invite for a web survey. Page 1400 includes a text box 1402 to allow the survey designer to specify an email subject line, a control to insert a campaign survey link (control 1404) (e.g., a URL for a survey form), a text box 1406 for the designer to input message body text and a text box 1408 for the designer to input unsubscribe text. Thus, the designer can design an email for the survey campaign that will be sent to survey targets for the campaign.

Returning to FIG. 2, server tier 202 receives, via interaction with operator interface 210, survey campaign information that identifies a survey form, a campaign schedule, trigger conditions and other parameters applicable to the survey campaign. A trigger condition may comprise an operation on a transaction metadata attribute. A survey campaign configured via operator interface 210 can be persisted as a survey campaign 248 in data store 206. Survey campaigns 248 may be stored as records in one or more tables in a database, files in a file system or combination thereof according to another data storage scheme. Each survey campaign 248 can comprise a variety of survey campaign data, such as, but not limited to, a unique identifier, name, description, a reference to an associated survey form 246, filter criteria and campaign survey parameters. According to one embodiment, each survey campaign 248 comprises the attributes of a campaign object.

Server tier 202 further comprises a campaign manager 234 coupled to an outbound survey manager 250. Campaign manager 234 sends published campaigns and associated survey forms to outbound survey manager 250 and executes active campaigns. In executing an active campaign, campaign manager 234 may search transaction data for transactions meeting campaign trigger conditions and scheduling parameters. Campaign manager 234 further identifies a set of survey targets comprising a survey target for each transaction in the set of transactions identified as meeting the trigger conditions. According to one embodiment, campaign manager 234 can execute the operations specified for the campaign trigger conditions on the transaction metadata attributes of the transactions in data store 208 to identify the set of survey transactions that meet the trigger conditions. Executing a trigger condition operation may, for example, comprise creating a query that incorporates the trigger condition operation.

Campaign manager 234 generates worklists 240 of work items for the active campaigns and dispatches the worklists 240 to outbound survey manager 250 to control sending of surveys by an automated survey system. Each work item can include transaction identification data for a transaction that met the trigger conditions for a survey campaign and contact information for a survey target associated with the transaction for which transaction identification data is included in the work item.

Outbound survey system components 205 are configured to execute the worklists, published campaigns and published survey forms to conduct surveys with survey targets based on the worklists. The results of the conducted surveys may be stored as survey records in data store 208. According to one embodiment, the results of a survey may be stored in association with the transaction that triggered the survey.

Outbound survey manager 250 is coupled to an email server 252, web survey server 254 and an IVR system 256. Outbound survey manager 250 stores question data, survey form data and campaign data for published survey forms and campaigns. For a web survey campaign, outbound survey manager 250 may store a file (or files) for a survey form at a location in a file system or other data store at locations resolvable from a URL by web survey server 254 and configure web survey server 254 to resolve the survey link specified for the survey form to at least one of the files for the survey form. For a voice survey campaign, outbound survey manager 250 can store the survey form in an IVR format for an IVR system 256, for example as an associated set of prompt and question recording files or question text files (in a text-to-speech enabled system) associated with prompts and branching rules for progressing between the recordings/text.

Responsive to receiving a worklist 240 for a web survey campaign, outbound survey manager generates 250 emails for survey targets associated with the transactions in the worklist and sends the emails to the survey targets via email server 252. In generating an email to a particular survey target associated with a transaction for a survey campaign, outbound survey manager 250 can embed a targeted survey link in the email. The targeted survey link may include the campaign survey link specified for the campaign (e.g., using control 1404 of FIG. 14), transaction data (e.g., as part of a URL query string) or other information. The transaction data may include transaction identification data (the transaction id or other data that can be used to correlate survey recipient interactions with a particular transaction). Thus, when web survey server 254 receives a URL request for a survey, web survey server 254 can associate the request and subsequent interactions with a particular survey and transaction. Other mechanisms may also be used for correlating web requests with particular transactions.

Outbound survey manager 250 may also configure the campaign survey link or targeted survey links to expire (e.g., based on the input using control 1310). According to one embodiment, survey manager 250 stores expiration times for targeted survey links in a database or other data store accessible by web survey server 254. Other mechanisms for expiring links may also be used.

Web survey server 254 comprises a web server configured to receive URL requests, resolve the URL requests to survey forms, dynamically generate responsive web pages and store data submitted via the web pages. According to one embodiment, responsive to receiving a URL request, the web survey server 254 determines if the URL is expired. If the URL is expired, web server 254 can generate a page notifying the survey taker that the URL is expired. If the URL is not expired, web survey server can resolve the URL to a survey form (e.g., based on the campaign survey URL) and generate and return a web page containing the greeting according to the survey form and a link to the first survey question. If the user requests the first survey question, the web survey server 254 can generate a web page with survey question text and answer controls (e.g., selection menu, check boxes, or other controls) based on the allowable survey answers defined for the survey question to allow the recipient to select from or otherwise input a recipient survey answer. Based on the recipient survey answer to a survey question, web survey server 254 can proceed to the next question, if any, (e.g., as defined by list 1002 or a branching rule) and generate a web page for the next question. This process can be repeated until the recipient has completed the survey.

Thus, based on the recipient interactions, the web survey server 254 can serve a survey according to the survey form as a series of web pages and store the recipient survey answers. Through cookies, URL query strings or other mechanisms known in the art, web survey server 254 can track a transaction associated with the interactions. Web survey server 254 may also track survey metadata, such as the status of the survey (e.g., abandoned, survey completed, survey declined, error or other status), time it took to answer each survey question, and other metadata. Web survey server 254 provides the survey results to the outbound survey manager. The survey results may comprise, for example, recipient survey answers (if any) and survey metadata (e.g., survey id, transaction identification data for the transaction that triggered the survey, survey status, time it took to answer each question). Outbound survey manager 250 can return the survey results for each transaction id in a worklist to campaign manager 234 and campaign manager can store the survey results in data store 208.

Responsive to receiving a worklist 240 for a voice survey campaign, outbound survey manager 250 can provide the worklist to IVR system 256. IVR system 256 establishes queues of calls based worklists and auto-dial the customer number. IVR system 256 can be configured with rules to requeue a call if the customer line is busy or does not pick up and scheduling rules for requeued calls. For example, only requeue a call 5 times and only redial a number after 24 hours have passed. In any event, if the customer answers the call, the IVR system 256 can progress through the survey and provide the recipient survey answers and survey metadata to outbound survey manager 250. Outbound survey manager 250 can return the survey results for each transaction identified in a worklist to campaign manager 234 and campaign manager can store the survey results in data store 208.

Figure 15:
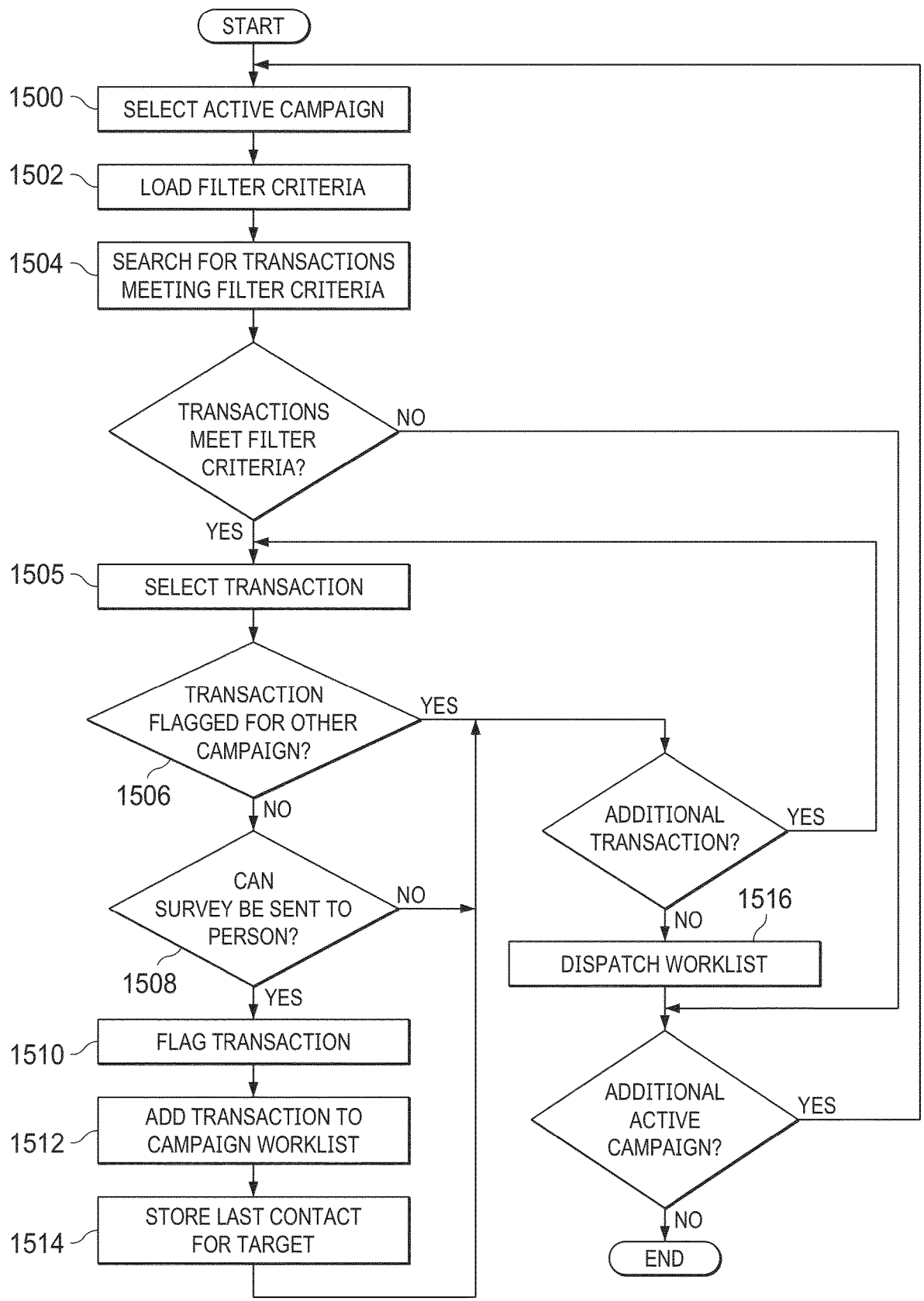
FIG. 15 is a flow chart illustrating one embodiment of a method for controlling an automated outbound survey system.

FIG. 15 is a flow chart illustrating one embodiment of a method for controlling an automated outbound survey system. The steps of FIG. 15 may be implemented by a processor of a survey campaign system that executes instructions stored on a computer readable medium. The processor may be coupled to a data store, such as data store 118 or data store 208. In one embodiment, the processor may implement a campaign manager or other component of a survey campaign system.

The survey campaign system selects an active campaign from a set of campaigns (e.g., campaigns 248) (step 1500) as the "current campaign" and loads the trigger conditions for the current campaign (step 1502). For the current campaign, survey campaign system searches transactions (e.g., in data store 208) for transactions that meet the trigger conditions of the active campaign (step 1504). More particularly, the survey campaign system can search the transactions and determine transactions having transaction metadata that meets filter rules or other trigger conditions specified for the current campaign.

If no transactions meet the active campaign, the survey campaign system can proceed to the next active campaign (return to step 1500). If there are transactions that meet the filter criteria for the current campaign, processing can proceed to step 1505. At step 1505, the survey campaign system can select a transaction that meets the active campaign filter criteria as the current transaction.

The survey campaign system determines if the current transaction is flagged for another campaign (step 1506). If so, survey campaign system can proceed to the next transaction that meets the filter criteria for the current campaign (e.g., return to step 1505). If the current transaction is not flagged for use in another campaign, the survey campaign system determines if a survey can be sent to the customer associated with the transaction (step 1508) based on the survey scheduling parameters or other survey parameters for the active campaign. For example, if a do not contact period has been specified for the campaign (e.g., using control 1304), the outbound survey system determines the last time the person (e.g., customer) associated with current transaction was contacted based on the current campaign (e.g., from data store 206) and if the current date/time is in a do not contact period relative to the person, determines that a survey cannot be sent to the person based on the campaign. As another example, the survey campaign system can determine when the current transaction was recorded from the transaction metadata of the current transaction and if the delay period has expired. If the delay period has not expired when applied to the current transaction, the survey campaign system can determine that a survey cannot be sent for the current campaign based on the current transaction. As yet another example, if a maximum time after an interaction has been set (e.g., using control 1308) the survey campaign system can determine when the current transaction was recorded from the transaction metadata of the current transaction and if the if the maximum time has expired for the current transaction. If the maximum time has expired for the current transaction, the survey campaign system can determine that a survey cannot be sent for the current transaction according to the current campaign.

If a survey can be sent to a person associated with the current transaction based on the current transaction, the campaign survey system can flag the current transaction as a campaign transaction for the current campaign. That is, flag the current transaction as in use for the current campaign (e.g., in transaction metadata of call data store 208) (step 1510). This can ensure that the same transaction is not picked up for another active campaign.

The person (e.g., customer) associated with the current transaction for which a survey can be sent can be considered a survey target. The survey campaign system may access contact information for the survey target. In one embodiment, this contact information may be stored as part of the transaction metadata of the current transaction. In addition, or in the alternative, the survey campaign system may use information from the transaction metadata to access contact information for the survey target from a contact database or other data source. For example, the survey campaign system may use a phone number, name, customer id or other information in transaction metadata to lookup contact information for the survey target in customer data 209.

At step 1512, the survey campaign system adds a work item as a worklist entry to a worklist for the current campaign. The work item can comprise the transaction id for the current transaction and survey target information (e.g., email address for the survey target, phone number for the survey target or other contact information) for the survey target (e.g., customer) associated with the current transaction.

At step 1514, the survey campaign system stores a current date as a last contacted date for a survey target. For example, the survey targets of a survey campaign and last contact dates for the survey campaign may be stored part of the survey campaign (e.g., stored as part of a campaign 248). Thus, the survey target associated with the current transaction and an associated last contact time may be stored as part of the current campaign at step 1514. In another embodiment, the last contact time for a survey campaign may be stored as part of a customer record (e.g., customer data 209). In any event, the survey campaign system may track last contact times for survey targets of survey campaigns.

Each transaction that meets the trigger conditions of the current campaign can be processed to build a worklist for the current campaign. Thus, the survey campaign system can identify a set of transactions that meet a trigger condition of the survey campaign from a plurality of transactions, identify a set of survey targets that includes a survey target for each transaction in the set of transactions, and generate a worklist for the campaign. At step 1516, the survey campaign system dispatches the worklist for the current campaign to an outbound survey system. As discussed below, the worklist can control conducting of surveys by an automated survey system.

The survey campaign system can be configured to process transactions to build worklists for active campaigns on a schedule (e.g., every five minutes, every 10 minutes or according to other schedules) or on demand. The steps of FIG. 15 are provided by way of example and may be performed in other orders. Moreover, steps may be repeated or omitted, or additional steps added.

Figure 16:
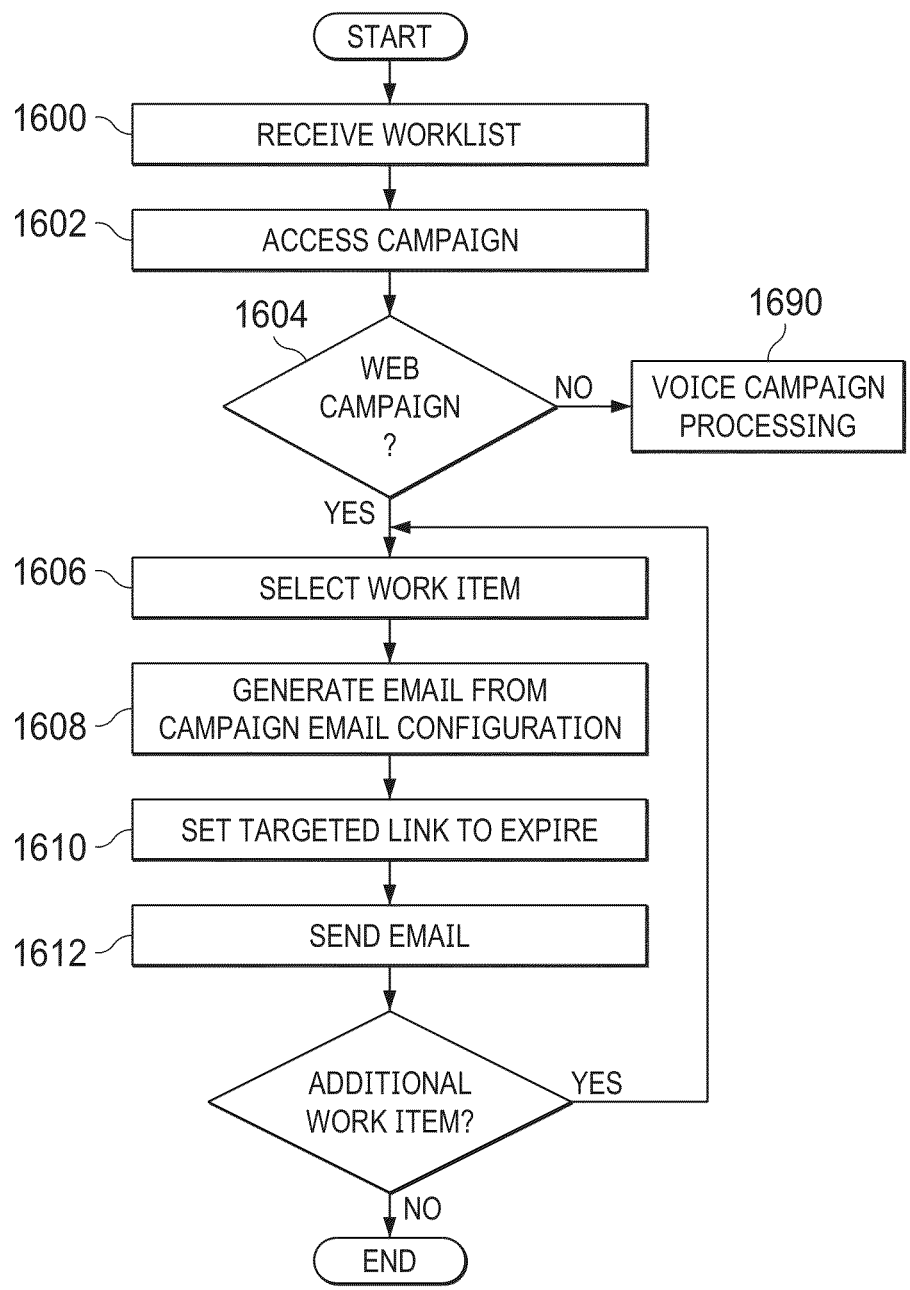
FIG. 16 is a flow chart illustrating one embodiment a method for processing a worklist at an outbound survey system.
Figure 18:
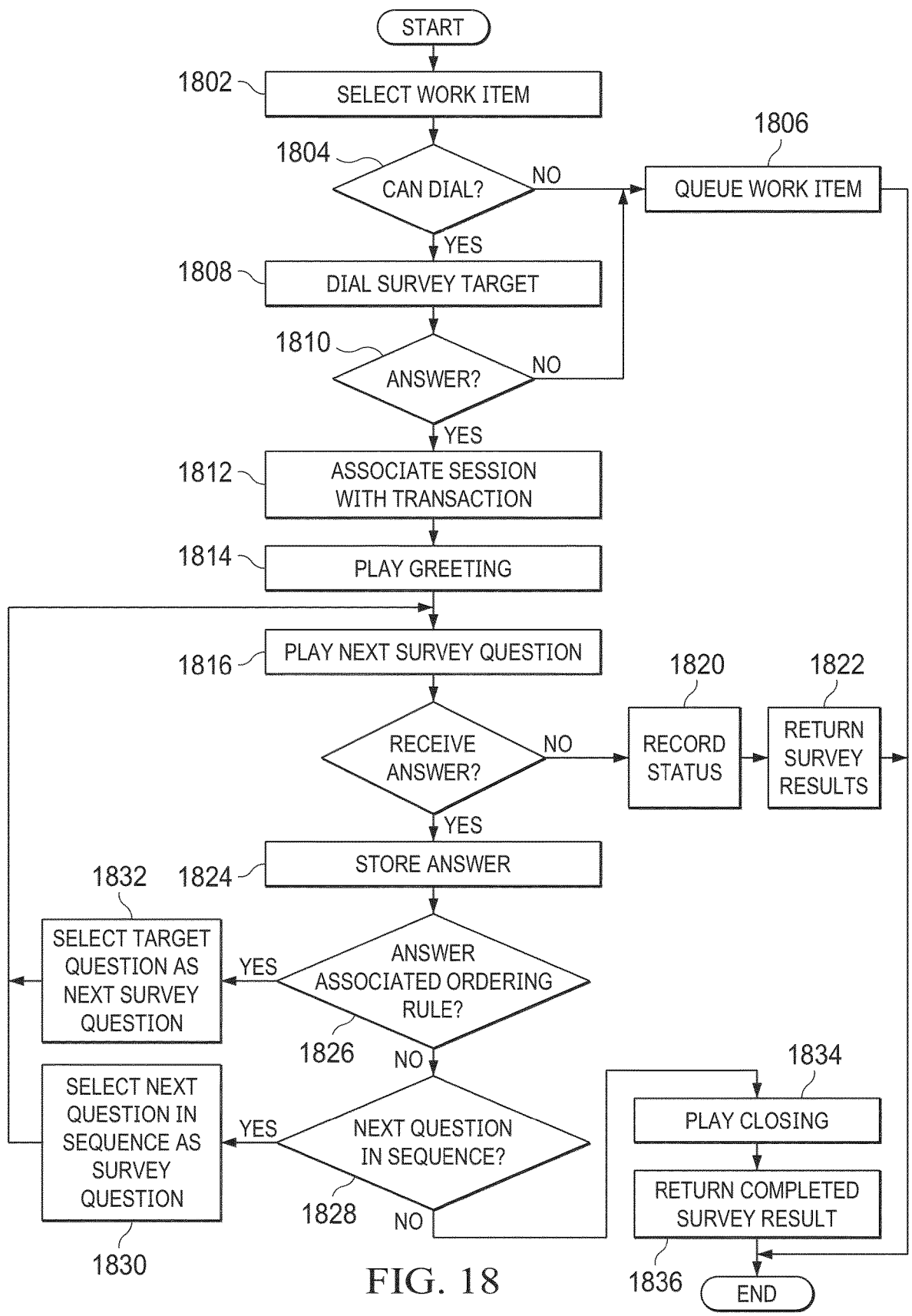
FIG. 18 is a flow chart illustrating an example flow for conducting a voice survey with a survey recipient that may be implemented by an automated outbound survey system.

FIG. 16 illustrates one embodiment a method for processing a worklist at an outbound survey system. The outbound survey system receives a worklist for a campaign (step 1600), accesses the campaign for which the worklist is provided (step 1602) and determines if the campaign is a web campaign or a voice campaign (step 1604). If the worklist is a worklist for a voice campaign, the outbound survey system processes the worklist according to a voice campaign processing flow (indicated at 1690). One example of voice campaign processing is illustrated in FIG. 18.

If the worklist is a worklist for a web campaign, processing proceeds to step 1606 and the outbound survey system selects a work item from the worklist. The work item can comprise the transaction id for a transaction and survey target information (e.g., email address for the survey target, phone number for the survey target or other contact information) for the survey target (e.g., customer) associated with the transaction identified in the work item.

The outbound survey system generates an email to the survey target specified by the work item using the survey target information from the work item and the email invite configuration stored for the campaign (step 1608). The outbound survey system embeds the survey link for the campaign in the email. In some embodiments, the outbound survey link may be enhanced with other information to create a targeted survey link. For example, according to one embodiment, the outbound survey system may append (e.g., as part of a URL query string) transaction id data or other data to the survey link specified for the campaign. The survey link embedded in the email may be set to expire (step 1610) based on a link expiration set for the campaign.

The outbound survey system sends the email to the survey target (step 1612). As illustrated, an email may be sent for each work item in the work list. The steps of FIG. 16 are provided by way of example and may be performed in other orders. Moreover, steps may be repeated or omitted, or additional steps added.

Figure 17:
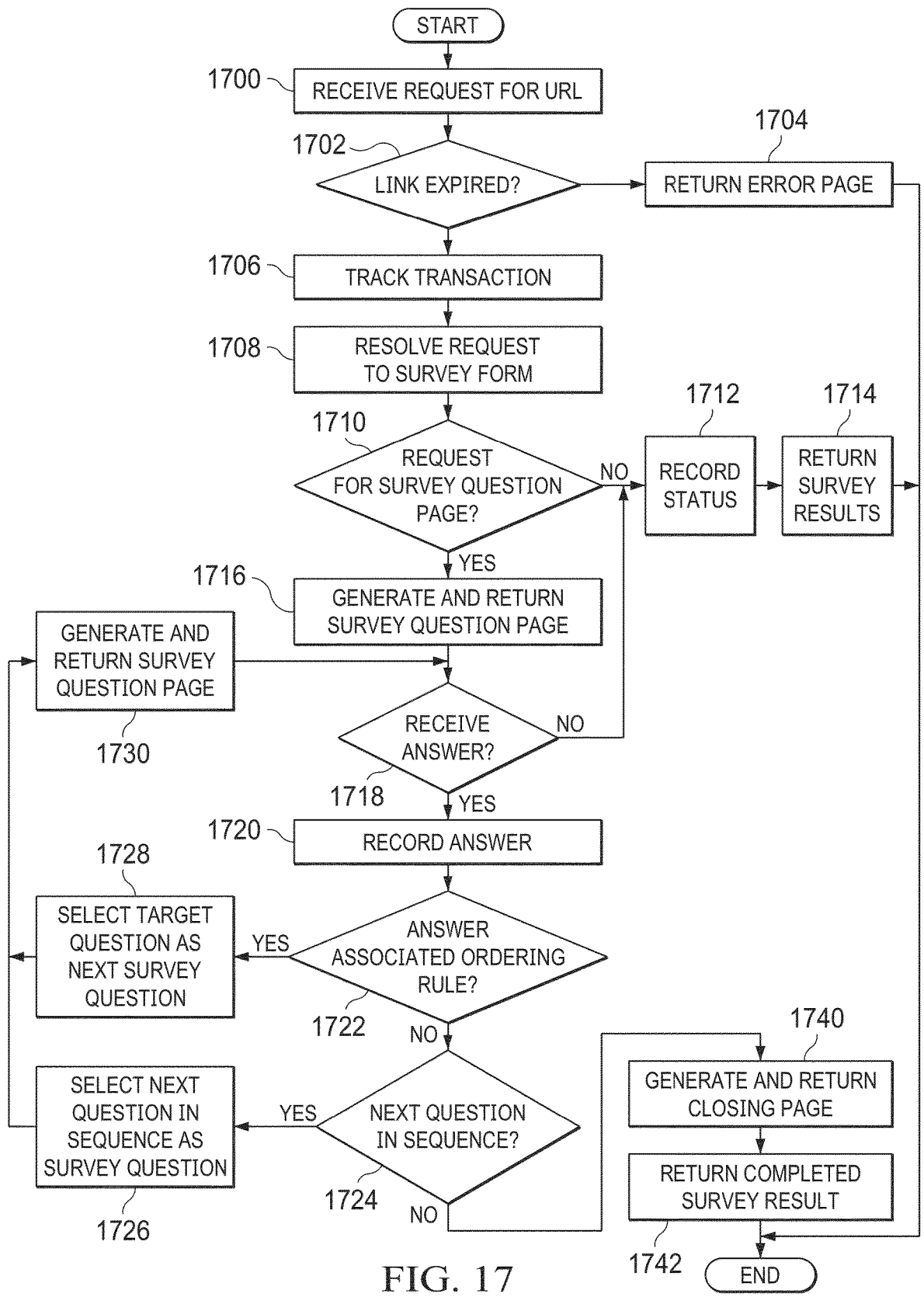
FIG. 17 is a flow chart illustrating an example flow for conducting a web survey.

FIG. 17 is a flow chart illustrating an embodiment of a flow for conducting a web survey with a survey recipient that may be implemented by an outbound survey system. According to one embodiment, the steps of FIG. 17 can be implemented by outbound survey manager 250 and web survey server 254.

The outbound survey system receives a URL request for a survey from a browser or other survey recipient client application (step 1700) and determines if the URL is expired (step 1702). If the link is expired, the outbound survey system can return a page to the requesting application to notify the user of the requesting application that the link has expired (step 1704). If the link has not expired, the outbound survey system can begin tracking interactions with the requesting application using a transaction identification data associated with the request (for example, as included in the URL request) (step 1706). For example, outbound survey system can associate a web session with the survey recipient client application with the transaction identification data (e.g., the transaction id or other data that can be used to correlate survey recipient answers and survey statuses with a particular transaction) so that interactions that occur during the session can be associated with the transaction identification data for the transaction that triggered the survey. Further, the outbound survey system can resolve the request to the survey form (step 1708). For example, the outbound survey system resolves the request to a page incorporating the greeting for the survey form associated with the campaign (e.g., the greeting that was entered using control 802).

In the embodiment illustrated, the survey recipient proceeds to a survey question by requesting via link in the greeting page, the first survey question. If the outbound survey system does not receive a request for a question page, the outbound survey system stores a status, such as survey terminated (step 1712), and sends the survey results to the survey campaign system (step 1714). The survey result may include transaction identification data for a transaction that triggered the survey, survey identification data, such as survey name or survey id, campaign identification data (e.g., campaign name or id) or other data.

If the survey recipient client application requests a survey question, the outbound survey system generates and returns a web page for the next survey question to the survey recipient client application (step 1718). For the first question page, the next question may be the first question in the question sequence that was defined by control 1002 when the survey form was created. If the outbound survey system does not receive an answer to the question from the survey recipient client application, the outbound survey system can update a status of the survey (step 1712) and send the survey results to the survey campaign system (step 1714). The survey result may include survey identification information, such as survey name or survey id, campaign identification information (e.g., campaign name or id), transaction identification information for the transaction that triggered the survey, survey status and survey answers, if any. The survey campaign system can store the survey results in a data store (e.g., as a survey record in data store 118, 208).

If the survey recipient client application submits an answer, the outbound survey system stores the answer (step 1720) and a time it took the survey recipient to answer the survey question. The outbound survey system further determines if the answer provided by the survey recipient is associated with an answer-specific branching rule, such as jump that was defined using control 1006 (step 1722). If the received answer is not associated with an answer-specific branching rule, the outbound survey system determines if there is a next question in the question sequence defined by the survey form (step 1724). If there is a next question in the question sequence defined by the survey form, the outbound survey system selects the next question in the question sequence defined by the survey form as the next survey question (step 1726). On the other hand, if it is determined at step 1722 that the answer provided by the survey recipient to the survey question is associated with and branching rule, the outbound survey system selects the target question of the branching rule defined by the survey form as the next survey question (step 1728). The outbound survey system generates a page for the next survey question and returns the page for the next survey question to the survey recipient client application (step 1730).

Based on a determination by the outbound survey system that there are no further survey questions to ask the survey recipient, the outbound survey system can generate a closing page (e.g., containing the closing defined for the survey form using control 804) and send the closing page to the survey recipient client application (step 1740).

At step 1742, the outbound survey system can return the completed survey result to the survey campaign system. The survey result may include transaction identification data for the transaction that triggered the survey, survey identification data, such as survey name or survey id, campaign identification data (e.g., campaign name or id) the survey recipient's survey answers or other data. The survey campaign system can store the completed survey as a survey in a data store (e.g., as a survey record in data store 118, 208). The completed survey may include survey metadata and survey answers.

The steps of FIG. 17 are provided by way of example and may be performed in other orders. Moreover, steps may be repeated or omitted, or additional steps added.

FIG. 18 is a flow chart illustrating an embodiment of a flow for conducting a voice survey with a survey recipient that may be implemented by an automated outbound survey system. According to one embodiment, the steps of FIG. 18 can be implemented by outbound survey manager 250 and an IVR system 256. FIG. 18 may be an example of voice campaign processing 1690.

The outbound survey system selects a work item from the worklist for a campaign (step 1802) and determines if an IVR system can dial the survey target based on, for example, the allowable times specified using controls 1312 when the campaign was created (step 1804). If the current time is outside of the allowable times, the outbound survey system can queue the work item until the allowable time (step 1806) and then process the work item. If, on the other hand, the current time is within the allowable time, the outbound survey system can dial survey target using the survey target contact information in the work item (step 1808). If the survey target does not answer, as determined at step 1810, the outbound survey system can queue the work item (step 1806) for redial at a later time.

If the survey target does answer, the outbound survey system can establish a voice session between an IVR system and the survey target and correlate the telephone survey session with the transaction identification data (e.g., the transaction id or other data that can be used to correlate survey recipient answers and survey statuses with a particular transaction) so that interactions that occur during the session can be associated with the transaction identified in the work item (step 1812). The outbound survey system can further play greeting for the survey campaign (e.g., a recording of the greeting that was entered using control 902) (step 1814).

The outbound survey system can further play the next survey question (step 1816) from the survey form associated with the campaign. After the greeting, the next survey question may be the first question in the question sequence that was defined by control 1002 when the survey form was created. If the outbound survey system does not receive an answer from the survey recipient, the outbound survey system can update a status of the survey (step 1820) and send the survey results to the survey campaign system (step 1822). The survey result may include survey identification information, such as survey name or survey id, campaign identification information (e.g., campaign name or id), transaction identification information for the transaction that triggered the survey, survey status and survey answers, if any. The survey campaign system stores the survey results in a data store (e.g., as a survey record in data store 118, 208).

If the survey recipient submits an answer, the outbound survey system stores the answer (step 1824) and a time it took the survey recipient to answer the survey question. The outbound survey system further determines if the answer provided by the survey recipient is associated with an answer-specific branching rule, such as jump that was defined using control 1006 (step 1826). If the received answer is not associated with an answer-specific branching rule, the outbound survey system determines if there is a next question in the question sequence defined by the survey form (step 1828). If there is a next question in the question sequence defined by the survey form, the outbound survey system selects the next question in the question sequence defined by the survey form as the next survey question (step 1830). On the other hand, if it is determined at step 1826 that the answer provided by the survey recipient to the survey question is associated with an answer-specific branching rule, the outbound survey system selects the target question of the branching rule defined by the survey form as the next survey question (step 1832). The outbound survey system plays the selected next survey question (step 1816).

Based on a determination by the outbound survey system that there are no further survey questions to ask the survey recipient, the outbound survey system can play a closing message (e.g., a recording of the closing defined for the survey form using control 904) and hang up (step 1834).

At step 1836, the outbound survey system can return the completed survey result to the survey campaign system. The survey result may include transaction identification data for a transaction that triggered the survey, survey identification data, such as survey name or survey id, campaign identification data (e.g., campaign name or id), the survey recipient's answers or other data. The survey campaign system can store the completed survey as a survey in a data store (e.g., as a survey record in data store 118, 208). The completed survey may include survey metadata and survey answers.

The steps of FIG. 18 are provided by way of example and may be performed in other orders. Moreover, steps may be repeated or omitted, or additional steps added.

Figure 19:
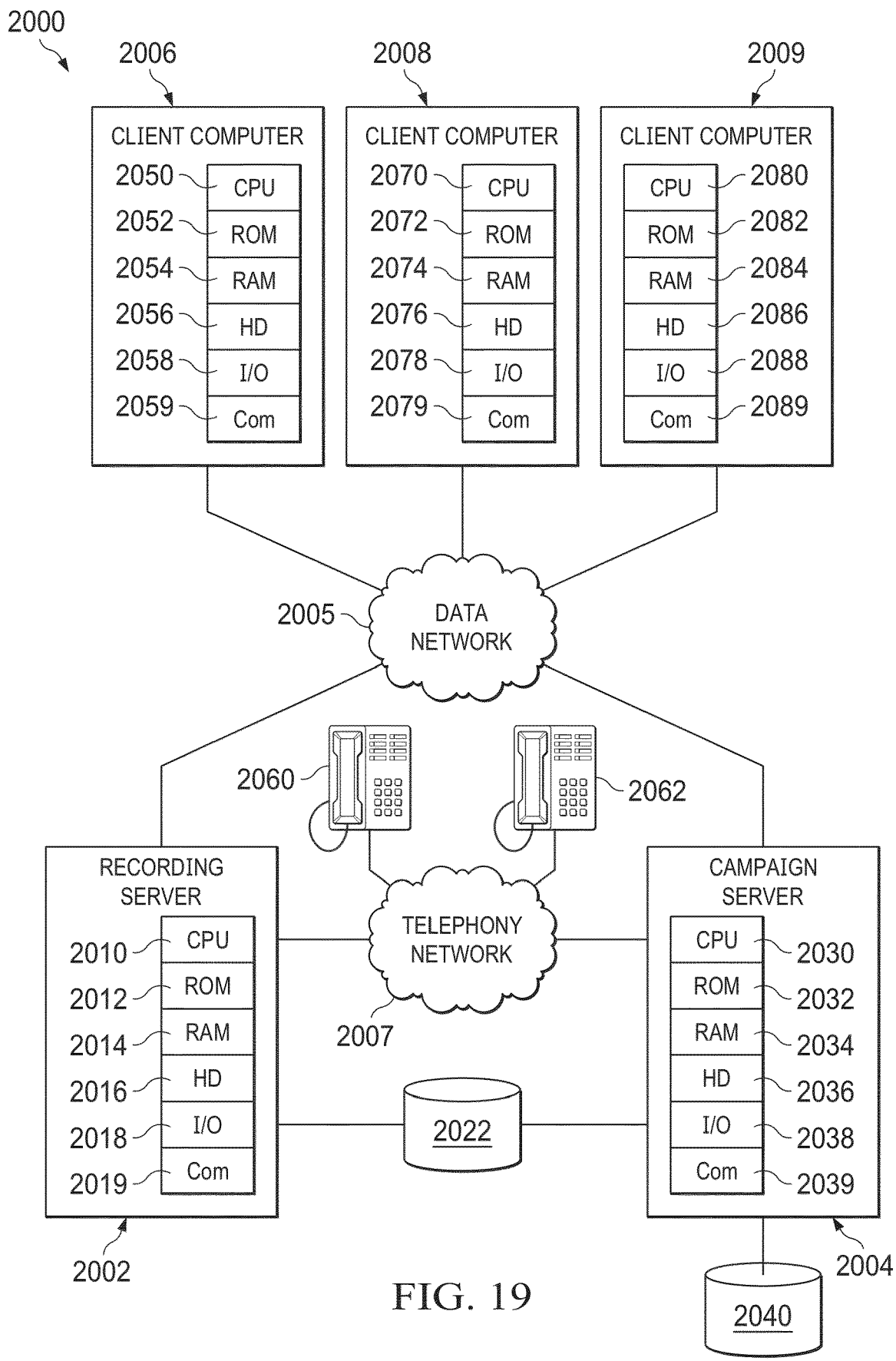
FIG. 19 is a diagrammatic representation of a distributed network computing environment.

FIG. 19 is a diagrammatic representation of a distributed network computing environment 2000 where embodiments disclosed herein can be implemented. In the example illustrated, network computing environment 2000 includes a data network 2005 that can be bi-directionally coupled to client computers 2006, 2008, 2009 and server computers 2002 and 2004. Network 2005 may represent a combination of wired and wireless networks that network computing environment 2000 may utilize for various types of network communications known to those skilled in the art. Data network 2005 may be, for example, a WAN, LAN, the Internet or a combination thereof.

Further, network computing environment includes a telephony network 2007 to connect server computer 2002 and server computer 2004 to call center voice instruments 2060 and external voice instruments 2062. Telephony network 2007 may utilize various types of voice communication known in the art. Telephony networks may comprise, for example, a PTSN, PBX, VOIP network, cellular network, or combination thereof.

For the purpose of illustration, a single system is shown for each of computer 2002, 2004, 2006, 2008 and 2009 and a single voice instrument is shown for each of voice instruments 2060, 2062. However, with each of computer 2002, 2004, 2006, 2008 and 2009 may comprise a plurality of computers (not shown) interconnected to each other over network 2005. For example, a plurality of computers 2002, a plurality of computers 2004, a plurality of computers 2006, a plurality of computers 2008, a plurality of computer 2009 may be coupled to network 2005. Furthermore, a plurality of computers 2002, plurality of computers 2004, a plurality of voice instruments 2062 and a plurality of voice instruments 2060 may be coupled to telephony network 2007.

Server computer 2002 can include can include central processing unit ("CPU") 2020, read-only memory ("ROM") 2022, random access memory ("RAM") 2024, hard drive ("HD") or storage memory 2026, input/output device(s) ("I/O") 2028 and communication interface 2029. I/O 2028 can include a keyboard, monitor, printer, electronic pointing device (e.g., mouse, trackball, stylus, etc.), or the like. Communications interface may include a communications interface, such as a network interface card, to interface with network 2005 and phone interface cards to interface with telephony network 2007.

According to one embodiment, server computer 2002 may include computer executable instructions stored on a non-transitory computer readable medium coupled to a processor. The computer executable instructions of server 2002 may be executable to provide a recording system. For example, the computer executable instructions may be executable to provide a recording server, such as recording server 114, or an ingestion server, such as ingestion server 116. Server computer 2002 may implement a recording system that records voice sessions between a voice instrument 2060 and a voice instrument 2062 (e.g., between a call center agent voice instrument and a customer voice instrument) and data sessions with client computer 2006. Server computer 2002 stores session data for voice and data sessions in transaction data store 2022.

Server computer 2004 can comprise CPU 2030, ROM 2032, RAM 2034, HD 2036, I/O 2038 and communications interface 2039. I/O 2038 can include a keyboard, monitor, printer, electronic pointing device (e.g., mouse, trackball, stylus, etc.), or the like. Communications interface 2039 may include a communications interface, such as a network interface card, to interface with network 2005 and telephony interface card to interface with telephony network 2007.

According to one embodiment, server computer 2004 may include a processor (e.g., CPU 2030) coupled to a data store configured to store transactions (e.g., transaction metadata and associated recorded sessions). For example, server computer 2004 may include CPU 2030 coupled to data store 2022 via network 2005. Server computer 2004 may further comprise computer executable instructions stored on a non-transitory computer readable medium coupled to the processor. The computer executable instructions of server 2004 may be executable to provide a survey campaign system and outbound survey system.

The computer executable instructions may be executable to provide a variety of services to client computer 2006, 2008, such as providing interfaces to allow a designer to design questions, survey forms and survey campaigns. The computer executable instructions of server computer 2004 may be further executable to execute campaigns to provide voice surveys to external voice instrument 2060 or web surveys to client computer 2009. The computer executable instructions may further utilize data stored in a data store 2040. According to one embodiment, the computer executable instructions may be executable to implement server tier 202.

Computer 2006 can comprise CPU 2050, ROM 2052, RAM 2054, HD 2056, I/O 2058 and communications interface 2059. I/O 2058 can include a keyboard, monitor, printer, electronic pointing device (e.g., mouse, trackball, stylus, etc.), or the like. Communications interface 2059 may include a communications interface, such as a network interface card, to interface with network 2005. Computer 2006 may comprise call center agent software to allow a call center agent to participate in a data session that is recorded by server 2002. Computer 2006 may be an example of an agent computer 164 or a supervisor computer 174.

Computer 2008 can similarly comprise CPU 2070, ROM 2072, RAM 2074, HD 2076, I/O 2078 and communications interface 2079. I/O 2078 can include a keyboard, monitor, printer, electronic pointing device (e.g., mouse, trackball, stylus, etc.), or the like. Communications interface 2079 may include a communications interface, such as a network interface card, to interface with network 2005. Computer 2008 may comprise a web browser or other application that can cooperate with server computer 2004 to allow a user to define questions, survey forms and campaigns. Computer 2008 may be an example of a client computer 180. According to one embodiment, computer 2006 or computer 2008 may implement client tier 203.

Computer 2009 can similarly comprise CPU 2080, ROM 2082, RAM 2084, HD 2086, I/O 2088 and communications interface 2089. I/O 2088 can include a keyboard, monitor, printer, electronic pointing device (e.g., mouse, trackball, stylus, etc.), or the like. Communications interface 2089 may include a communications interface, such as a network interface card, to interface with network 2005. Computer 2009 may comprise an email application that allows a survey target to receive survey invites and a web browser that allows the survey recipient to participate in web surveys.

Call center voice instrument 2060 and external voice instrument 2062 may operate according to any suitable telephony protocol. Call center voice instrument 2060 can be an example of agent voice instrument 162 or supervisor voice instrument 172 and external voice instrument 2062 may be an example of a customer voice instrument, which may also be an example of a survey target voice instrument.

Each of the computers in FIG. 19 may have more than one CPU, ROM, RAM, HD, I/O, or other hardware components. For the sake of brevity, each computer is illustrated as having one of each of the hardware components, even if more than one is used. Each of computers 2002, 2004, 2006, 2008, 2009 is an example of a data processing system. ROM 2012, 2032, 2052, 2072 and 2082; RAM 2014, 2034, 2054, 2074 and 2084; HD 2016, 2036, 2056, 2076 and 2086; and data store 2022, 2040 can include media that can be read by 2010, 2030, 2050, 2070 and 2080. These memories may be internal or external to computers 2002, 2004, 2006, 2008 or 2009.

Portions of the methods described herein may be implemented in suitable software code that may reside within ROM 2012, 2032, 2052, 2072 and 2082; RAM 2014, 2034, 2054, 2074 and 2084; HD 2016, 2036, 2056, 2076 and 2086. In addition to those types of memories, the instructions in an embodiment disclosed herein may be contained on a data storage device with a different computer-readable storage medium. Alternatively, the instructions may be stored as software code elements on a data storage array, magnetic tape, floppy diskette, optical storage device, or other appropriate data processing system readable medium or storage device.

Although the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention. At least portions of the functionalities or processes described herein can be implemented in suitable computer-executable instructions. The computer-executable instructions may reside on a computer readable medium, hardware circuitry or the like, or any combination thereof.

Those skilled in the relevant art will appreciate that the invention can be implemented or practiced with other computer system configurations including, without limitation, multi-processor systems, network devices, mini-computers, mainframe computers, data processors, and the like. The invention can be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks).

Any suitable programming language can be used to implement the routines, methods or programs of embodiments of the invention described herein, including C, C++, Java, JavaScript, HTML, or any other programming or scripting code, etc. Different programming techniques can be employed such as procedural or object oriented. Other software/hardware/network architectures may be used. Communications between computers implementing embodiments can be accomplished using any electronic, optical, radio frequency signals, or other suitable methods and tools of communication in compliance with known network protocols.

As one skilled in the art can appreciate, a computer program product implementing an embodiment disclosed herein may comprise a non-transitory computer readable medium storing computer instructions executable by one or more processors in a computing environment. The computer readable medium can be, by way of example only but not by limitation, an electronic, magnetic, optical or other machine readable medium. Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices.

Particular routines can execute on a single processor or multiple processors. Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. Functions, routines, methods, steps and operations described herein can be performed in hardware, software, firmware or any combination thereof.

It will also be appreciated that one or more of the elements depicted in the drawings/figures can be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited to only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Generally then, although the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

What is claimed is:

1. A data processing system for controlling automated surveys, comprising:

a server tier having a processor;

a data store;
a non-transitory computer readable medium having instructions executable on the processor for:
  for each of a plurality of transactions, during each respective transaction, automatically collecting, from a routing system and one or more call center adjunct services systems, transaction metadata and a voice session recording of a respective inbound call recorded by a call center recording system, the transaction metadata for each respective transaction comprising an identifier for the respective transaction and a plurality of metadata attributes relating to technical details of the respective voice session recording;
  storing the collected transaction metadata from the plurality of transactions in the data store;
  defining a survey trigger condition for a survey campaign, wherein defining the survey trigger condition comprises receiving input from a survey designer via a configuration interface page, the input including a filter rule specifying a Boolean operation to be applied on transaction metadata attributes;
  establishing communications with a client tier having an operator interface;
  receiving, by the server tier via interaction with the operator interface of the client tier, survey campaign information configured via the operator interface of the client tier, the survey campaign information comprising a reference to a survey form, a campaign schedule and the defined trigger condition applicable to the survey campaign;
  applying the filter rule to the transaction metadata attributes relating to a respective voice session recording;
  based on a determination that the survey campaign is active according to the campaign schedule, executing the survey campaign, by the server tier, wherein executing the survey campaign comprises:
    identifying, by the server tier, a set of transactions from the plurality of transactions that meet the defined trigger condition;
    identifying, by the server tier, a set of survey targets, the set of survey targets comprising a survey target for each transaction in the set of transactions;
    generating, by the server tier, a worklist for the survey campaign to control conducting of surveys by an automated survey system that is configured to execute the worklist, the worklist comprising a work item for each of the set of transactions and each work item comprising transaction identification data for a transaction from the set of transactions and contact information for the survey target for the transaction corresponding to the transaction identification data in the work item; and
    providing the worklist to the automated survey system to cause the automated survey system to conduct surveys according to a survey form based on the worklist;
  receiving a set of survey results from the automated survey system, each survey result comprising transaction identification information for a triggering transaction from the set of transactions; and
  storing survey results for conducted surveys in the data store in association with the set of transactions.

2. The data processing system of claim 1, wherein the non-transitory computer readable medium further comprises instructions executable on the processor for processing the worklist to control the conducting of the surveys according to the survey form.

3. The data processing system of claim 1, wherein the campaign information further includes a campaign type selected from a plurality of campaign types.

4. The data processing system of claim 3, wherein the campaign types comprise a voice survey campaign and a web survey campaign.

5. The data processing system of claim 1, wherein non-transitory computer readable medium further comprises instructions executable on the processor for receiving, by the processor, survey form information defining the survey form, the survey form comprising a sequence of questions, allowable answers for questions in the sequence of questions and branching instructions, the branching instructions configured to control providing of the questions in the sequence of questions to survey recipients.

6. The data processing system of claim 5, wherein the non-transitory computer readable medium further comprises instructions executable on the processor for executing the branching instructions to control providing the questions in the sequence of questions to the survey recipients.

7. The data processing system of claim 5, wherein the non-transitory computer readable medium further comprises instructions executable on the processor for executing the operation on the transaction metadata attribute for each of the plurality of transactions to identify the set of transactions.

8. A computer program product comprising:
  a non-transitory computer readable medium storing a set of computer executable instructions executable by a processor to:
    for each of a plurality of transactions, during each respective transaction, automatically collecting, from a routing system and one or more call center adjunct services systems, transaction metadata and a voice session recording of a respective inbound call recorded by a call center recording system, the transaction metadata for each respective transaction comprising an identifier for the respective transaction and a plurality of metadata attributes relating to technical details of the respective voice session recording;
    storing the collected transaction metadata from the plurality of transactions in the data store;
    define a survey trigger condition for a survey campaign, wherein defining the survey trigger condition comprises receiving input from a survey designer via a configuration interface page, the input including a filter rule specifying a Boolean operation to be applied on transaction metadata attributes;
    establish communications with a client device having an operator interface;
    receive, by the processor via interaction with the operator interface of the client device, survey campaign information configured via the operator interface of the client device, the survey campaign information comprising a reference to a survey form, a campaign schedule and the defined trigger condition applicable to the survey campaign;
    apply the filter rule to the transaction metadata attributes relating to a respective voice session recording;
    based on a determination that the survey campaign is active according to the campaign schedule:
      search a data store storing the plurality of transactions;

identify, by the processor, a set of transactions from the plurality of transactions that meet the defined trigger condition;

identify, by the processor, a set of survey targets, the set of survey targets comprising a survey target for each transaction in the set of transactions;

generate, by the processor, a worklist for the survey campaign to control conducting of surveys by an automated survey system that is configured to execute the worklist, the worklist comprising a work item for each of the set of transactions and each work item comprising transaction identification data for a transaction from the set of transactions and contact information for the survey target for the transaction corresponding to the transaction identification data in the work item; and provide the worklist to the automated survey system to cause the automated survey system to conduct surveys based on the worklist and according to a survey form;

receive a set of survey results from the automated survey system, each survey result comprising transaction identification data for a triggering transaction from the set of transactions; and store survey results for conducted surveys in the data store in association with the triggering transaction.

9. The computer program product of claim 8, wherein the non-transitory computer readable medium further comprises instructions executable to process the worklist to control the conducting of the surveys according to the survey form.

10. The computer program product of claim 8, wherein the campaign information further includes a campaign type selected from a plurality of campaign types.

11. The computer program product of claim 10, wherein the campaign types comprise a voice survey campaign and a web survey campaign.

12. The computer program product of claim 8, wherein the non-transitory computer readable medium further comprises instructions executable to receive, by the processor, survey form information defining the survey form, the survey form comprising a sequence of questions, allowable answers for questions in the sequence of questions and branching instructions, the branching instructions configured to control providing of the questions in the sequence of questions to survey recipients.

13. The computer program product of claim 12, wherein the non-transitory computer readable medium further comprises instructions to execute the branching instructions to control providing the questions in the sequence of questions to the survey recipients.

14. The computer program product of claim 8, wherein the non-transitory computer readable medium further comprises instructions executable on the processor for executing the operation on the transaction metadata attribute for each of the plurality of transactions to identify the set of transactions.

15. A method comprising:

for each of a plurality of transactions, during each respective transaction, automatically collecting, from a routing system and one or more call center adjunct services systems, transaction metadata and a voice session recording of a respective inbound call recorded by a call center recording system, the transaction metadata for each respective transaction comprising an identifier for the respective transaction and a plurality of metadata attributes relating to technical details of the respective voice session recording;

storing the collected transaction metadata from the plurality of transactions in the data store;

defining a survey trigger condition for a survey campaign, wherein defining the survey trigger condition comprises receiving input from a survey designer via a configuration interface page, the input including a filter rule specifying a Boolean operation to be applied on transaction metadata attributes;

establishing communications between a server tier and a client tier having an operator interface;

receiving, by a processor of the server tier via interaction with the operator interface of the client tier, survey campaign information configured via the operator interface of the client tier, the survey campaign information comprising a reference to a survey form, a campaign schedule and the defined trigger condition applicable to the survey campaign;

applying the filter rule to the transaction metadata attributes relating to a respective voice session recording;

based on a determination that the survey campaign is active according to the campaign schedule, executing the survey campaign, by the processor, wherein executing the survey campaign comprises:

identifying, by the processor, a set of transactions from the plurality of transactions that meet the defined trigger condition;

identifying, by the processor, a set of survey targets, the set of survey targets comprising a survey target for each transaction in the set of transactions;

generating, by the processor, a worklist for the survey campaign to control conducting of surveys by an automated survey system that is configured to execute the worklist, the worklist comprising a work item for each of the set of transactions and each work item comprising transaction identification data for a transaction from the set of transactions and contact information for the survey target for the transaction corresponding to the transaction identification data in the work item; and providing the worklist to the automated survey system to cause the automated survey system to conduct surveys according to a survey form based on the worklist;

receiving a set of survey results from the automated survey system, each survey result comprising transaction identification information for a triggering transaction from the set of transactions; and storing survey results for conducted surveys in the data store in association with the set of transactions.

16. The method of claim 15, further comprising processing the worklist, by the processor, to control the conducting of the surveys according to the survey form.

17. The method of claim 15, wherein the campaign information further includes a campaign type selected from a plurality of campaign types.

18. The method of claim 17, wherein the campaign types comprise a voice survey campaign and a web survey campaign.

19. The method of claim 15, further comprising receiving, by the processor, survey form information defining the survey form, the survey form comprising a sequence of questions, allowable answers for questions in the sequence of questions and branching instructions, the branching instructions configured to control providing of the questions in the sequence of questions to survey recipients.

20. The method of claim 19, further comprising executing the branching instructions, by the processor, to control providing the questions in the sequence of questions to the survey recipients.

21. The method of claim 15, further comprising executing the operation on the transaction metadata attributes for each of the plurality of transactions to identify the set of transactions.

* * * * *